United States Patent
Becker

(10) Patent No.: US 12,516,649 B2
(45) Date of Patent: Jan. 6, 2026

(54) INTERCHANGEABLE INTAKE MANIFOLD ASSEMBLIES WITH INTERCHANGEABLE FLARE HOUSINGS

(71) Applicant: Velossa Tech Engineering Inc., Davie, FL (US)

(72) Inventor: Dan Joseph Becker, Davie, FL (US)

(73) Assignee: Velossa Tech Engineering Inc., Davie, FL (US)

( * ) Notice: Subject to any disclaimer, the term of this patent is extended or adjusted under 35 U.S.C. 154(b) by 769 days.

(21) Appl. No.: 17/677,573

(22) Filed: Feb. 22, 2022

(65) Prior Publication Data

US 2022/0324319 A1 Oct. 13, 2022

Related U.S. Application Data

(63) Continuation of application No. PCT/US2021/026465, filed on Apr. 8, 2021.

(51) Int. Cl.
*B60K 13/02* (2006.01)
*B60Q 1/44* (2006.01)
(Continued)

(52) U.S. Cl.
CPC ....... *F02M 35/10262* (2013.01); *B60K 13/02* (2013.01); *B60Q 1/442* (2013.01);
(Continued)

(58) Field of Classification Search
CPC ............. B60K 13/02; F02M 35/10262; F02M 35/10124; F02M 35/10118; F02M 35/10144

See application file for complete search history.

(56) References Cited

U.S. PATENT DOCUMENTS

| 3,485,252 A | 12/1969 | Brown |
| 3,987,862 A | 10/1976 | Lidstone |

(Continued)

FOREIGN PATENT DOCUMENTS

| DE | 10358382 A1 * | 7/2005 | .......... F02B 27/0215 |
| DE | 102005040850 A1 | 3/2007 | |

(Continued)

OTHER PUBLICATIONS

Great Britain Examination Report mailed Aug. 14, 2023 cited in Application No. GB2211571.1, 5 pgs.

(Continued)

*Primary Examiner* — Katy M Ebner
(74) *Attorney, Agent, or Firm* — BEKIARES ELIEZER LLP

(57) ABSTRACT

In one aspect, an apparatus may include a base member being defined by an aperture configured to receive and engage an automobile intake box, the base member being further defined by a perimeter surrounding the aperture and having at least one fastener or aperture configured to receive a fastener dimensioned to avoid disturbing the automobile intake box; a base member fixedly attached to the base member, the base member having a first end opening and a second end opening, the base member having an interior cavity configured to direct air into the automobile intake box from the second end opening to the first end opening through the interior cavity; and an interchangeable bell housing removably secured to the second end opening of the base member, the interchangeable flare housing having a plurality of types of shaped cross sections on at least one plane.

20 Claims, 29 Drawing Sheets

(51) Int. Cl.
  *B60R 19/52* (2006.01)
  *F02M 35/10* (2006.01)
  *F02M 35/16* (2006.01)
(52) U.S. Cl.
  CPC ....... *B60R 19/52* (2013.01); *F02M 35/10124* (2013.01); *F02M 35/10144* (2013.01); *F02M 35/10321* (2013.01); *F02M 35/10327* (2013.01); *F02M 35/10347* (2013.01); *F02M 35/161* (2013.01)

(56) References Cited

U.S. PATENT DOCUMENTS

| | | | |
|---|---|---|---|
| 4,157,902 | A | 6/1979 | Tokar |
| 4,310,028 | A * | 1/1982 | Kennedy .......... F02M 35/10124 138/39 |
| 4,366,878 | A | 1/1983 | Warf |
| 4,463,711 | A * | 8/1984 | Yoshioka ......... F02M 35/10098 123/184.32 |
| 4,610,326 | A | 9/1986 | Kirchweger et al. |
| 4,782,912 | A * | 11/1988 | Wandless ........... F02M 35/1244 181/269 |
| 5,069,298 | A | 12/1991 | Titus |
| 5,147,430 | A | 9/1992 | Kidd |
| 5,195,484 | A | 3/1993 | Knapp |
| 5,251,712 | A | 10/1993 | Hayashi et al. |
| 5,609,298 | A | 3/1997 | Hyslop |
| 5,722,358 | A | 3/1998 | Fuesser et al. |
| 5,794,733 | A * | 8/1998 | Stosel .............. F02M 35/10137 180/68.1 |
| 5,878,715 | A * | 3/1999 | Hernandez ................ F02D 9/02 251/305 |
| 6,540,802 | B2 * | 4/2003 | Trautmann ........... F02M 35/168 55/432 |
| 6,698,539 | B2 | 3/2004 | Decuir |
| 6,902,595 | B2 * | 6/2005 | Darnell ............ F02M 35/10118 55/462 |
| 7,021,263 | B1 * | 4/2006 | Agnew ................ F02M 35/116 123/184.34 |
| 7,114,476 | B1 | 10/2006 | Wimmer |
| 7,614,379 | B2 * | 11/2009 | Now ................ F02M 35/10262 123/184.56 |
| D637,205 | S | 5/2011 | Luxon et al. |
| D642,199 | S | 7/2011 | Luxon et al. |
| 7,997,246 | B2 * | 8/2011 | Now ................ F02M 35/10144 123/184.56 |
| 8,127,878 | B2 * | 3/2012 | Teraguchi .............. B60K 13/02 180/68.1 |
| 8,181,729 | B2 | 5/2012 | Hiramatsu et al. |
| 8,277,548 | B2 | 10/2012 | Kleinfeld et al. |
| 8,919,315 | B2 * | 12/2014 | Borghi ............. F02M 35/10262 123/184.21 |
| 8,960,347 | B2 | 2/2015 | Bennett |
| 9,234,484 | B2 * | 1/2016 | Lewington ....... F02M 35/10013 |
| 9,574,790 | B2 | 2/2017 | Hasegawa et al. |
| 10,167,825 | B1 * | 1/2019 | Dane ................ F02M 35/10262 |
| 10,364,780 | B2 * | 7/2019 | Doveri ................... B01D 46/10 |
| 10,393,076 | B1 * | 8/2019 | Freeman ................ B60K 13/02 |
| 10,428,773 | B1 * | 10/2019 | Bennett .................. B60K 13/02 |
| D905,117 | S | 12/2020 | Bennett et al. |
| 11,135,538 | B2 | 10/2021 | Niakan et al. |
| 12,180,916 | B2 * | 12/2024 | Becker ............ F02M 35/10124 |
| 2001/0013675 | A1 | 8/2001 | Nakagawa et al. |
| 2004/0094111 | A1 | 5/2004 | Concialdi |
| 2004/0134461 | A1 | 7/2004 | Bishop |
| 2004/0139708 | A1 | 7/2004 | Giacinto |
| 2005/0072393 | A1 | 4/2005 | Now |
| 2005/0215191 | A1 * | 9/2005 | Kino ..................... B60K 13/02 454/143 |
| 2006/0185639 | A1 | 8/2006 | Rosenbaum |
| 2006/0278192 | A1 | 12/2006 | Now |
| 2010/0032220 | A1 * | 2/2010 | Ohira .................. F02M 35/161 123/556 |
| 2010/0147243 | A1 * | 6/2010 | Stec ................. F02M 35/10301 123/184.21 |
| 2012/0190290 | A1 * | 7/2012 | Niakan ............ F02M 35/10131 454/254 |
| 2015/0197149 | A1 | 7/2015 | Hudlund et al. |
| 2017/0072785 | A1 * | 3/2017 | Cho ........................ B60K 13/02 |
| 2017/0216754 | A1 * | 8/2017 | Ingham ................. B60Q 1/2661 |
| 2017/0260939 | A1 * | 9/2017 | Williams .............. F02M 35/161 |
| 2017/0313236 | A1 * | 11/2017 | McGowen .............. F21S 43/51 |
| 2018/0051859 | A1 * | 2/2018 | Scervo ................... B60K 13/02 |
| 2018/0258890 | A1 | 9/2018 | Takamura et al. |
| 2018/0274502 | A1 * | 9/2018 | Tani ..................... F02M 35/162 |
| 2018/0363603 | A1 | 12/2018 | Itagaki |
| 2019/0388819 | A1 | 12/2019 | Niakan et al. |
| 2019/0388820 | A1 * | 12/2019 | Niakan .............. F02M 35/0201 |
| 2020/0001219 | A1 | 1/2020 | Niakan et al. |
| 2020/0080523 | A1 | 3/2020 | Driant |
| 2020/0132027 | A1 | 4/2020 | Bennett et al. |
| 2020/0263641 | A1 | 8/2020 | Blanks |
| 2021/0033049 | A1 * | 2/2021 | Ohno ............... F02M 35/10262 |
| 2021/0148312 | A1 * | 5/2021 | Kober ............. F02M 35/10373 |
| 2021/0246855 | A1 * | 8/2021 | Becker ............. F02M 35/10262 |
| 2022/0324319 | A1 * | 10/2022 | Becker ................... B60K 13/02 |
| 2023/0035209 | A1 | 2/2023 | Zope et al. |
| 2025/0137425 | A1 | 5/2025 | Becker |

FOREIGN PATENT DOCUMENTS

| | | | | |
|---|---|---|---|---|
| EP | | 0867608 A2 | 9/1998 | |
| EP | | 2103511 B1 | 7/2010 | |
| FR | | 2933045 A1 | 1/2010 | |
| JP | | 6072074 B2 | 2/2017 | |
| WO | WO-2010065952 A1 * | | 6/2010 | ............ F02B 27/005 |
| WO | | 2021163711 A1 | 10/2021 | |

OTHER PUBLICATIONS

U.S. Non-Final Office Action dated Sep. 6, 2023 cited in U.S. Appl. No. 16/785,609, 20 pgs.
Chinese Second Office Action dated Sep. 21, 2022 cited in Application No. 202220245512.4, 7 pgs
Generation 4 Interchangeable Big Mouth | Flare/Inlet Only, https://web.archive.org/web/20201126061651/https://www.velossatechdesign.com/products/generation-4-interchangeable-big-mouth-flare-inlet-only, Nov. 26, 2020, 3 pgs.
How to Install Big Mouth Ram Air Intake Ford Focus RS, https://www.youtube.com/watch?v=bwPBelbTamY. Blake's Garage, Accessed Jan. 3, 2023, published on May 30, 2017 (Intvw Summ dtd Jan. 9, 2023).
Ford Focus Big Mount Intake Snorkel Install !. Https://www.youtube.com/watch?v=oV3E-IeEu4. Cameron Alford. Accessed Jan. 3, 2023, published on Nov. 12, 2019 (Intvw Summ dtd Jan. 9, 2023).
U.S. Non-Final Office Action dated Jan. 23, 2023 cited in U.S. Appl. No. 16/785,609, 41 pgs.
U.S. Non-Final Office Action (Updated) dated Feb. 1, 2023 cited in U.S. Appl. No. 16/785,609, 34 pgs.
U.S. Non-Final Office Action dated Sep. 21, 2021 cited in U.S. Appl. No. 16/785,609, 31 pgs.
International Search Report and Written Opinion dated Nov. 17, 2021 cited in PCT Application No. PCT/US21/26465, 22 pgs.
Video: Velossa Tech Gen 4 Released/Sneak Peak Veloster N Big Mouth With Exchangeable Flares, https://www.youtube.com/watch?v=DBsfgLQCa6Q, Feb. 12, 2021, 3 pgs.
Generation 4 Interchangeable Big Mouth | Flare/Inlet Only, https://web.archive.org/web/20201126061651/https://www.elossatechdesign.com/products/generation-4-interchangeable-big-mouth-flare-inlet-only, Nov. 26, 2020, 3 pgs.
Video: Focus ST Velossa Tech Big Mouth Install, https://www.youtube.com/watch?v=5MfC6K9doZA, Feb. 19, 2017, 3 pgs.
Related Design U.S. Appl. No. 29/817,918, filed Dec. 6, 2021, Inventor: Dan Joseph Becker.
Related Design U.S. Appl. No. 29/817,920, filed Dec. 6, 2021, Inventor: Dan Joseph Becker.

(56) References Cited

OTHER PUBLICATIONS

Related Design U.S. Appl. No. 29/817,923, filed Dec. 6, 2021, Inventor: Dan Joseph Becker.
Related Design U.S. Appl. No. 29/817,926, filed Dec. 6, 2021, Inventor: Dan Joseph Becker.
Related Design U.S. Appl. No. 29/817,931, filed Dec. 6, 2021, Inventor: Dan Joseph Becker.
Related Chinese Divisional Application No. 2022202455124 filed Jan. 29, 2022, Inventor: Dan Joseph Becker (English copy attached).
Chinese First Office Action dated Jun. 2, 2022 cited in Application No. 202220245512.4, 6 pgs.
International Preliminary Report on Patentability dated Aug. 18, 2022 cited in PCT Application No. PCT/US21/26465, 18 pgs.

* cited by examiner

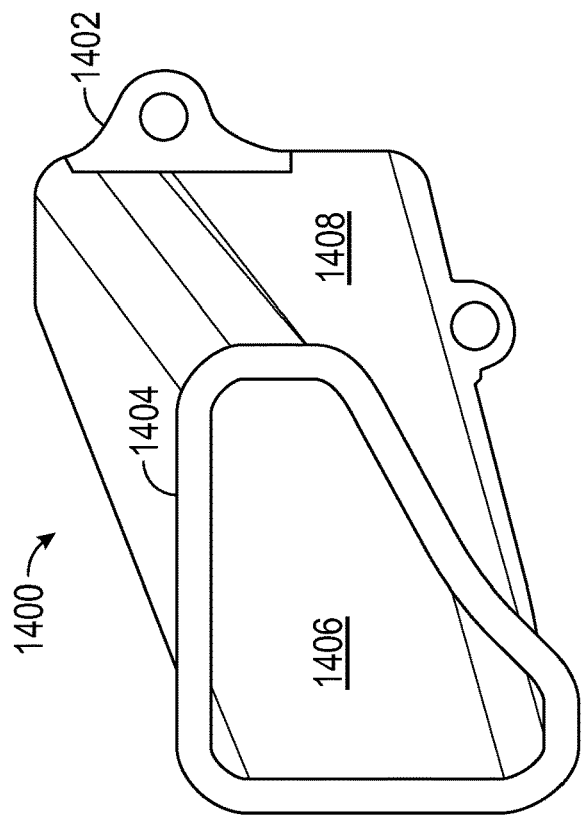
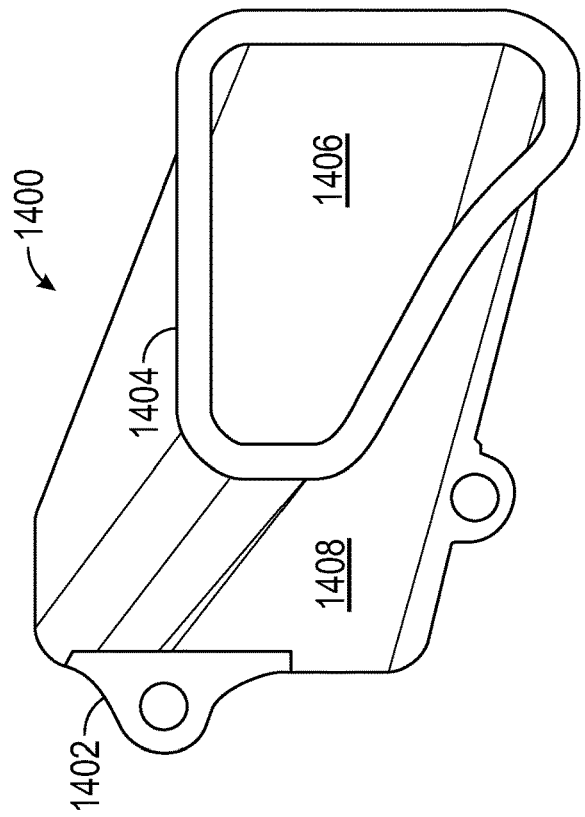
FIG. 14

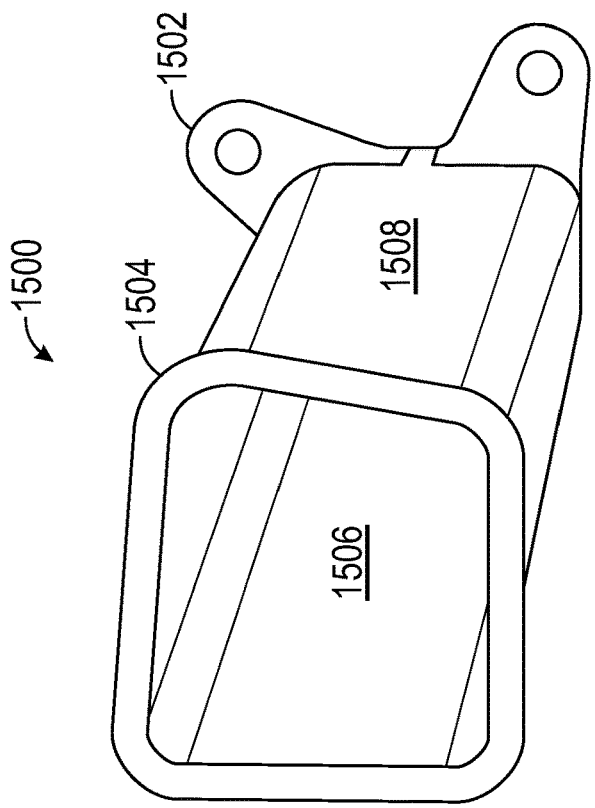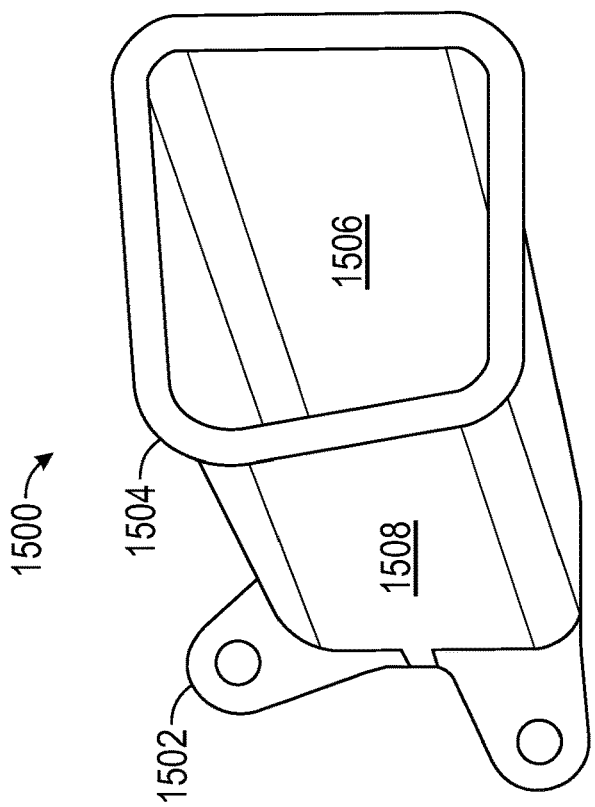
FIG. 15

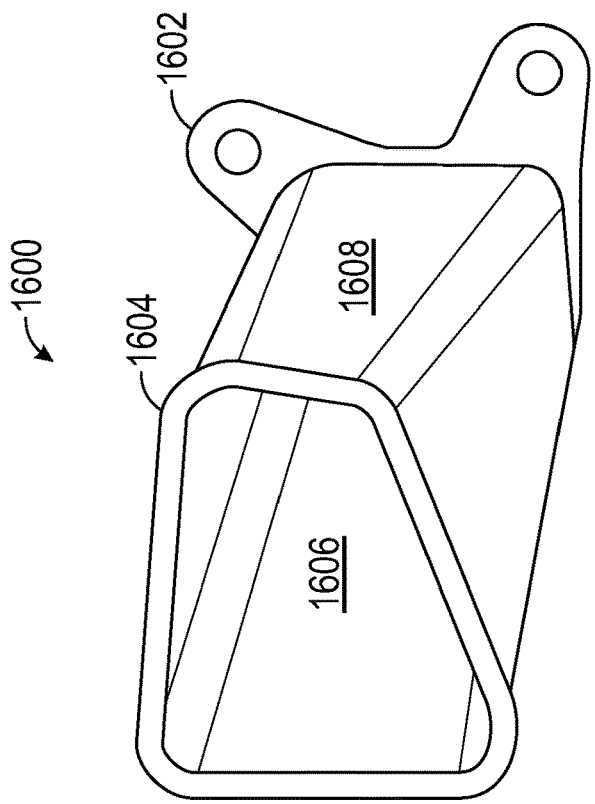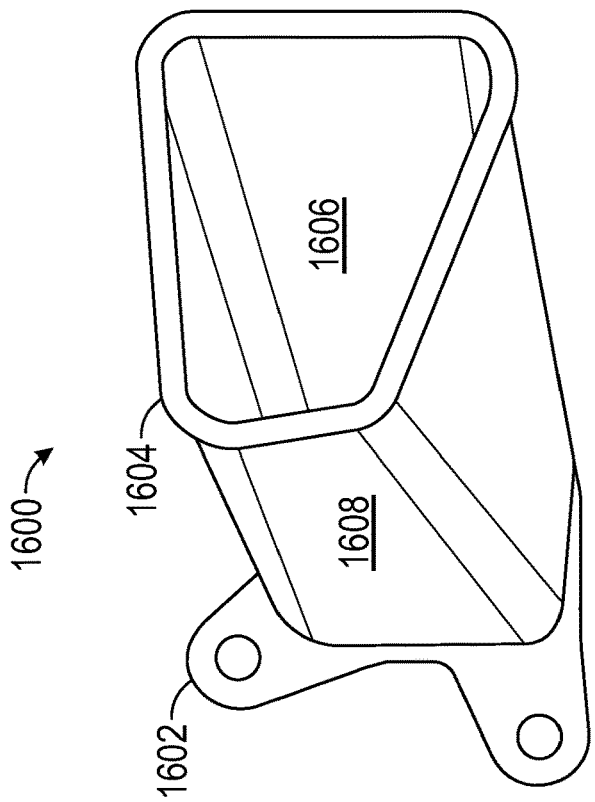
FIG. 16

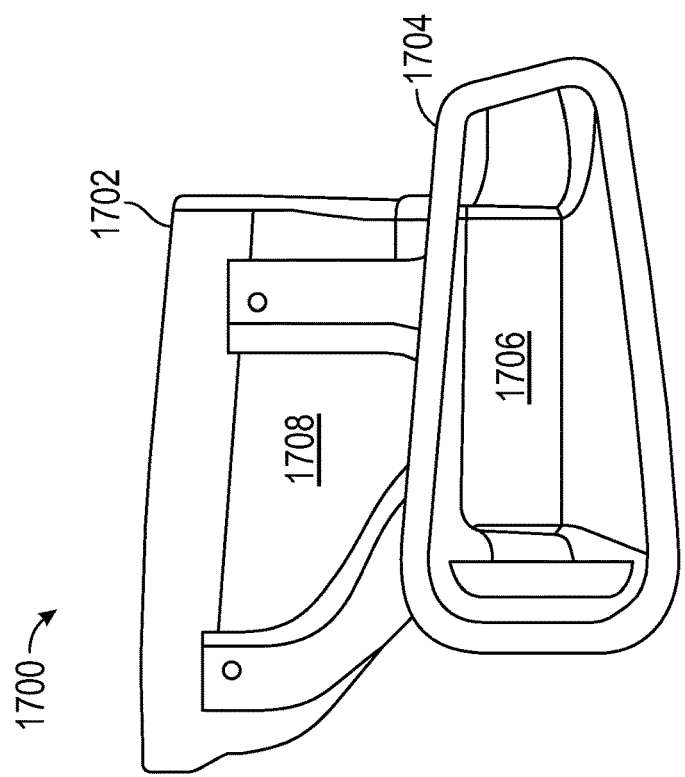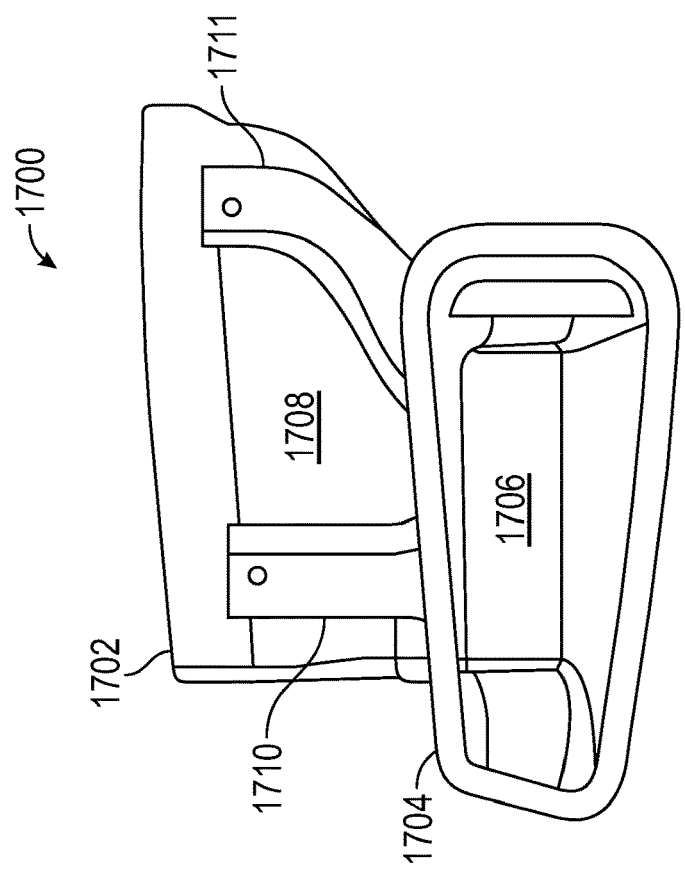
FIG. 17

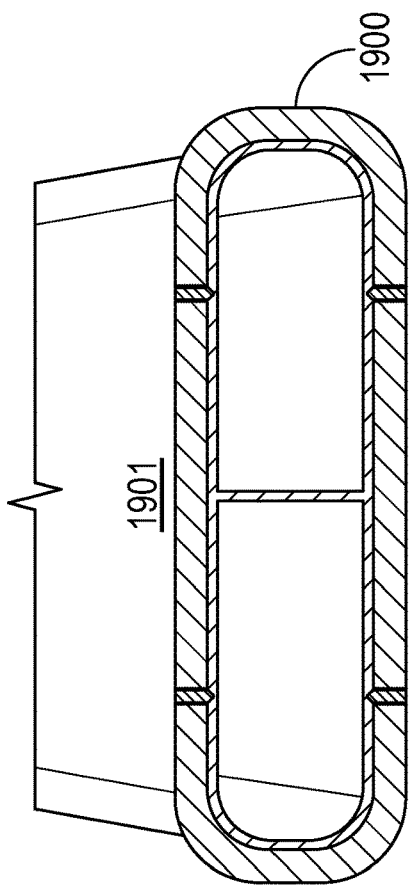
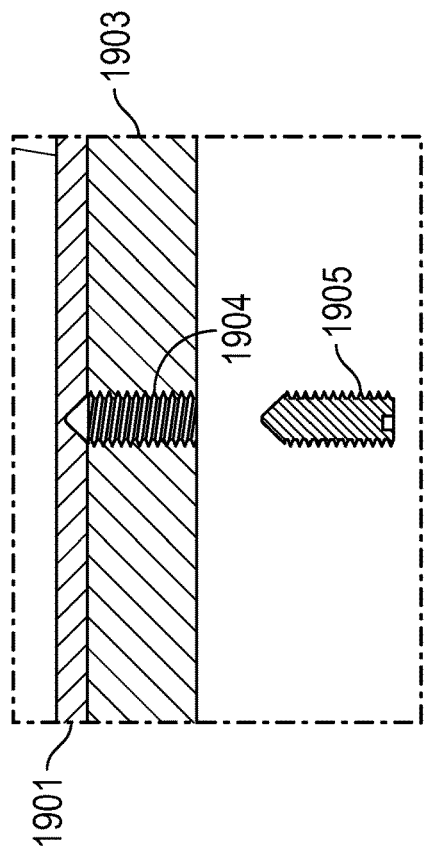
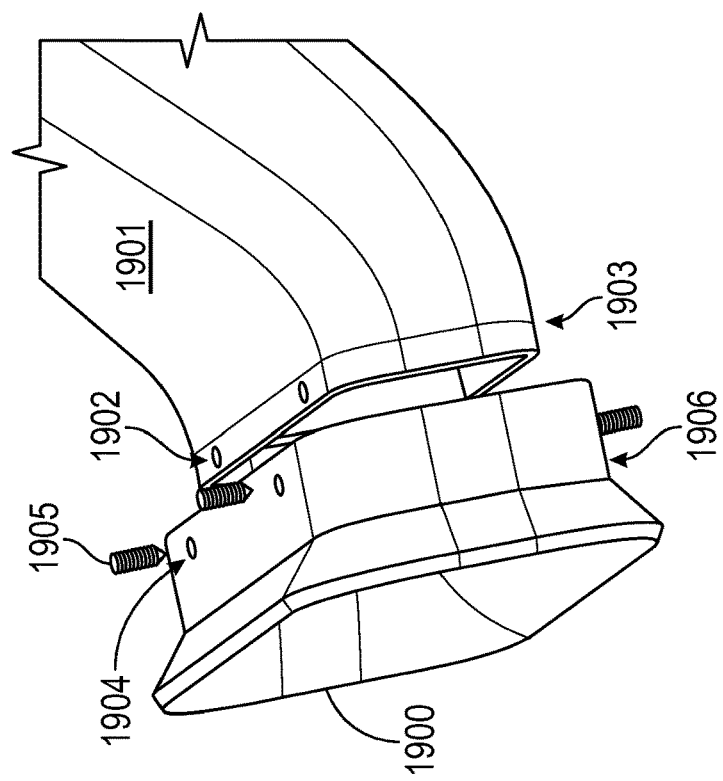
FIG. 19B
FIG. 19C
FIG. 19A

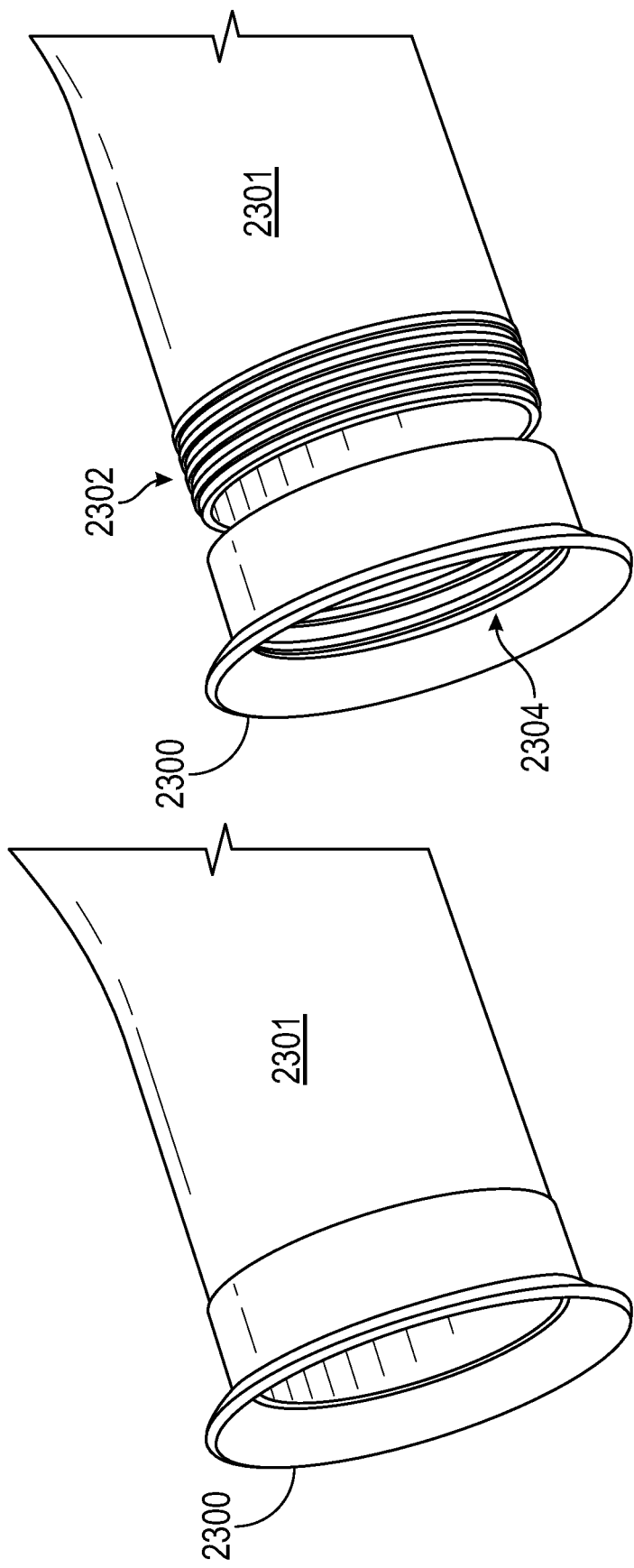

INTERCHANGEABLE INTAKE MANIFOLD ASSEMBLIES WITH INTERCHANGEABLE FLARE HOUSINGS

RELATED APPLICATIONS

This application is a Continuation of PCT Application No. PCT/US21/26465 filed on Apr. 8, 2021, which is related to U.S. application Ser. No. 16/785,609 filed on Feb. 9, 2020, which are incorporated by reference herein in its entirety.

It is intended that the above-referenced application may be applicable to the concepts and embodiments disclosed herein, even if such concepts and embodiments are disclosed in the referenced applications with different limitations and configurations and described using different examples and terminology.

FIELD OF INVENTION

The present invention relates to devices, systems, and methods for an interchangeable intake manifold assembly with interchangeable flare housings and portions thereof.

BACKGROUND OF THE INVENTION

Conventionally, intake manifold assembly upgrades to an automobile require cutting and/or altering the interior of an engine space, including sometimes permanent removal of engine components. For example, new intake manifold assemblies with interchangeable flare housings and portions thereof can require physically altering or replacing of an air box, installation of a cold air intake, cutting or drilling support structures, and other modifications to the interior of an engine bay.

Accordingly, there remains a need for interchangeable portions of intake systems. These and other needs are satisfied by the various aspects of the present disclosure.

SUMMARY OF THE INVENTION

In accordance with the purposes of the invention, as embodied and broadly described herein, the invention, in one aspect, relates to an intake manifold assembly that facilitates interchangeable parts.

According to one aspect, an interchangeable intake manifold assembly is a high-performance ram air intake line of interchangeable components designed to boost performance of automobiles. The intake manifold assemblies offer the ability of a user to customize an inlet horn, flare, throat, or mouth, which is visible through the grill of the vehicle, adding an aggressive and aesthetically pleasing appearance. In general, the intake bell house includes a larger inlet, converging to the stock cowl inlet already present in the vehicle.

According to one aspect, the converging, coupled with the relative speed of the vehicle, will boost air pressure to the airbox. This boosting generally increases performance. The horn, flare, throat, or mouth also increase customer appreciation due to the aggressive and aesthetically pleasing visual properties.

In still further aspects, the invention also relates to methods for interchanging portions of intake manifold assemblies and variants thereof.

According to an aspect, an apparatus may comprise a base member being defined by an aperture or opening configured to receive and engage an automobile intake box, the base member being further defined by a perimeter surrounding the aperture and having at least one fastener or aperture configured to receive a fastener dimensioned to avoid disturbing the automobile intake box; a gooseneck member fixedly attached to the base member, the gooseneck member having a first end opening and a second end opening, the gooseneck member having an interior cavity configured to direct air into the automobile intake box from the second end opening to the first end opening through the interior cavity; and an interchangeable bell housing removably secured to the second end opening of the gooseneck member, the interchangeable bell housing having a frustoconical shaped cross section on at least one plane.

According to another aspect, an apparatus may comprise a gooseneck member fixedly attached within an engine bay of an automobile, the gooseneck member having a first end opening and a second end opening, the gooseneck member having an interior cavity configured to direct air into an automobile intake airbox from the second end opening to the first end opening through the interior cavity; and an interchangeable bell housing removably secured to the second end opening of the gooseneck member. The interchangeable flare housing can have at least one of the following on at least one plane: a frustoconical shaped or substantially frustoconical shaped cross section, a frustopyramidal shaped or substantially frustopyramidal shaped cross section, a frustocylindrical shaped or substantially frustocylindrical shaped cross section, a box shaped or substantially box shaped cross section, a frustopolyhedrical shaped or substantially frustopolyhedrical shaped cross section, an asymmetrical frustopolyhedrical shaped or substantially asymmetrical frustopolyhedrical shaped cross section, a frustooctagonal-pyramidal shaped or substantially frustooctagonal-pyramidal shaped cross section, and an asymmetrical frustooctagonal-pyramidal shaped or substantially asymmetrical frustooctagonal-pyramidal shaped cross section, or combinations thereof.

According to yet another aspect, an apparatus may comprise a base member being defined by an aperture configured to receive and engage an automobile intake airbox, the aperture comprising at least four rounded corners, the base member being further defined by a perimeter surrounding the aperture and having two or more fasteners or apertures configured to receive fastener dimensioned to avoid disturbing the automobile intake airbox, the base member being formed of a rigid material; a gooseneck member fixedly attached to the base member, the gooseneck member having a first end opening and a second end opening, the first end opening being in fluid communication with the aperture, the gooseneck member having an interior cavity configured to direct air into the automobile intake airbox from the second end opening to the first end opening through the interior cavity; and an interchangeable bell housing removably secured to the second end opening of the gooseneck member, the interchangeable bell housing having a frustoconical shaped cross section on at least one plane and configured to receive air through a forward automotive intake grille arranged in front of the interchangeable bell housing such that the interchangeable bell housing is visible through the forward automotive intake grille.

According to yet another aspect, an interchangeable intake assembly may comprise a base member being defined by an aperture configured to receive and engage an automobile intake box. The base member is further defined by a perimeter surrounding the aperture and having at least one fastener or aperture configured to receive a fastener dimensioned to avoid disturbing the automobile intake box. The base member has a first end opening and a second end opening, the base member having an interior cavity configured to direct air into the automobile intake box from the second end opening to the first end opening through the interior cavity. Additionally, the interchangeable intake assembly includes an interchangeable flare housing removably secured to the second end opening of the base member. The interchangeable flare housing has at least one of the following on at least one plane: a frustoconical shaped or substantially frustoconical shaped cross section, a frustopyramidal shaped or substantially frustopyramidal shaped cross section, a frustocylindrical shaped or substantially frustocylindrical shaped cross section, a box shaped or substantially box shaped cross section, a frustopolyhedrical shaped or substantially frustopolyhedrical shaped cross section, an asymmetrical frustopolyhedrical shaped or substantially asymmetrical frustopolyhedrical shaped cross section, a frustooctagonal-pyramidal shaped or substantially frustooctagonal-pyramidal shaped cross section, and an asymmetrical frustooctagonal-pyramidal shaped or substantially asymmetrical frustooctagonal-pyramidal shaped cross section, and combinations thereof.

In another aspect, an interchangeable intake assembly comprises a base member that is defined by an aperture configured to receive and engage an automobile intake box. The base member is further defined by a perimeter surrounding the aperture and has at least one fastener or aperture configured to receive a fastener dimensioned to avoid disturbing the automobile intake box. The base member has a first end opening and a second end opening, the base member having an interior cavity configured to direct air into the automobile intake box from the second end opening to the first end opening through the interior cavity. In addition, the interchangeable intake assembly includes an interchangeable flare housing which has a clamshell assembly. The interchangeable flare housing is removably secured to the second end opening of the base member, the interchangeable flare having at least one of the following on at least one plane: a frustoconical shaped or substantially frustoconical shaped cross section, a frustopyramidal shaped or substantially frustopyramidal shaped cross section, a frustocylindrical shaped or substantially frustocylindrical shaped cross section, a box shaped or substantially box shaped cross section, a frustopolyhedrical shaped or substantially frustopolyhedrical shaped cross section, an asymmetrical frustopolyhedrical shaped or substantially asymmetrical frustopolyhedrical shaped cross section, a frustooctagonal-pyramidal shaped or substantially frustooctagonal-pyramidal shaped cross section, and an asymmetrical frustooctagonal-pyramidal shaped or substantially asymmetrical frustooctagonal-pyramidal shaped cross section, and combinations thereof.

Additional aspects of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several aspects of the invention and together with the description, serve to explain the principles of the invention.

FIG. 14 illustrates a front view of an interchangeable intake manifold assembly, according to an exemplary embodiment.

FIG. 15 illustrates a front view of an interchangeable intake manifold assembly, according to an exemplary embodiment.

FIG. 16 illustrates a front view of an interchangeable intake manifold assembly, according to an exemplary embodiment.

FIG. 17 illustrates a front view of an interchangeable intake manifold assembly, according to an exemplary embodiment.

FIG. 19A illustrates a perspective exploded view of the interchangeable intake manifold assembly with the interchangeable flare housing fastened together by a set screw coupling, according to an exemplary embodiment.

FIG. 19B illustrates a front view of the interchangeable intake manifold assembly with the interchangeable flare housing fastened together by the set screw coupling, according to an exemplary embodiment.

FIG. 19C illustrates a sectional exploded view of the interchangeable intake manifold assembly with the interchangeable flare housing fastened together by the set screw coupling, according to an exemplary embodiment.

FIG. 23A illustrates a perspective view of an interchangeable intake manifold assembly having a tubular body with an interchangeable flare housing fastened together by a screw coupling, according to an exemplary embodiment.

FIG. 23B illustrates a perspective exploded view of the interchangeable intake manifold assembly having a tubular body with the interchangeable flare housing fastened together by the screw coupling, according to an exemplary embodiment.

DETAILED DESCRIPTION OF THE INVENTION

Figure 1A:
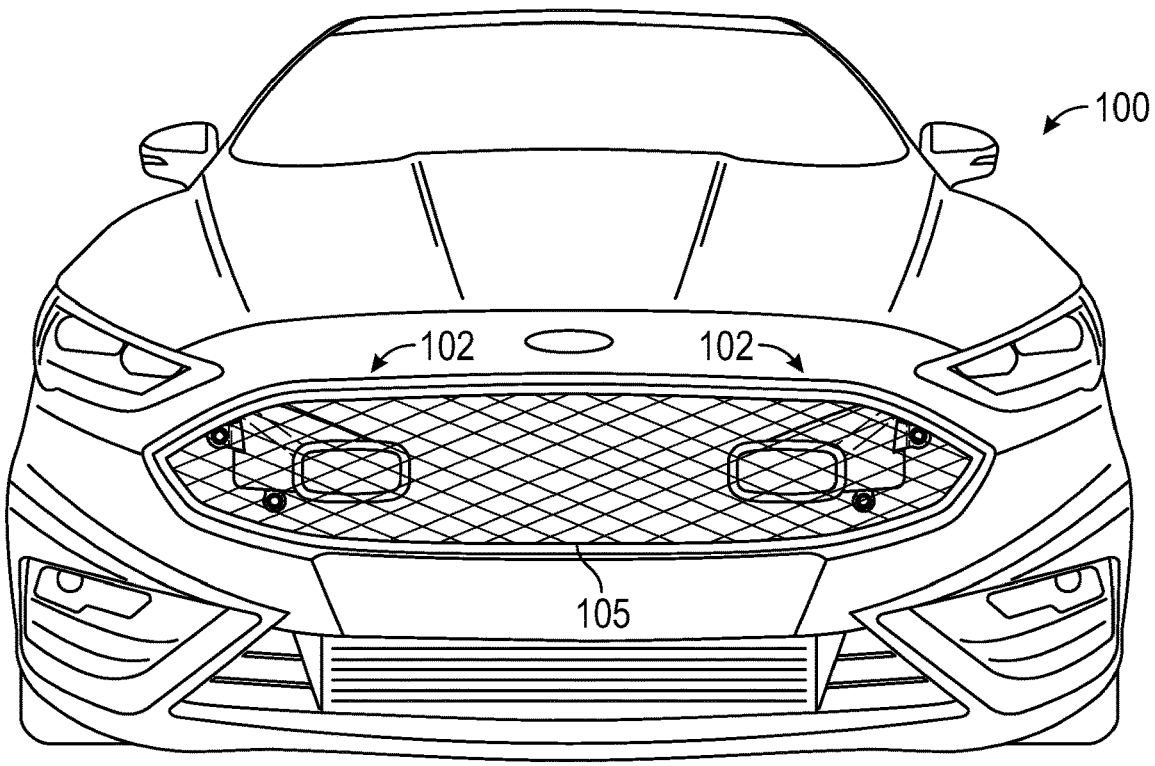
FIG. 1A illustrates a front view of an automobile with an interchangeable intake manifold assembly installed thereon, according to an exemplary embodiment.

The present invention can be understood more readily by reference to the following detailed description of the invention and the Examples included therein.

Before the present articles, systems, devices, and/or methods are disclosed and described, it is to be understood that they are not limited to specific manufacturing methods unless otherwise specified, or to particular materials unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

Any and all publications mentioned herein are incorporated herein by reference to disclose and describe the methods and/or materials in connection with which the publications are cited.

A. Definitions

It is also to be understood that the terminology used herein is for the purpose of describing particular aspects only and is not intended to be limiting. As used in the specification and in the claims, the term "comprising" can include the aspects "consisting of" and "consisting essentially of" Unless defined otherwise, all technical and scientific terms used herein have the same meaning as commonly understood by one of ordinary skill in the art to which this invention belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "an assembly" includes two or more assemblies.

Ranges can be expressed herein as from one particular value, and/or to another particular value. When such a range is expressed, another aspect includes from the one particular value and/or to the other particular value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

The terms "first," "second," "first part," "second part," and the like, where used herein, do not denote any order, quantity, or importance, and are used to distinguish one element from another, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optionally affixed to the surface" means that it can or cannot be fixed to a surface.

Disclosed are the components to be used to manufacture the disclosed devices and articles of the invention as well as the materials themselves to be used within the methods disclosed herein. These and other materials are disclosed herein, and it is understood that when combinations, subsets, interactions, groups, etc. of these materials are disclosed that while specific reference of each various individual and collective combinations and permutation of these materials cannot be explicitly disclosed, each is specifically contemplated and described herein. For example, if a particular material is disclosed and discussed and a number of modifications that can be made to the materials are discussed, specifically contemplated is each and every combination and permutation of the material and the modifications that are possible unless specifically indicated to the contrary. Thus, if a class of materials A, B, and C are disclosed as well as a class of materials D, E, and F and an example of a combination material, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the articles and devices of the invention. Thus, if there are a variety of additional steps that can be performed it is understood that each of these additional steps can be performed with any specific aspect or combination of aspects of the methods of the invention.

It is understood that the devices and systems disclosed herein have certain functions. Disclosed herein are certain structural requirements for performing the disclosed functions, and it is understood that there are a variety of structures that can perform the same function that are related to the disclosed structures, and that these structures will typically achieve the same result.

As used in the specification and the appended claims, shapes designated as triangular refer to all forms of triangles, including isosceles, right triangles, and others, unless explicitly narrowed to a particular triangle.

As used in the specification and the appended claims, shapes designated with the phrase "generally rectangular" refer to all forms of rectangular shapes, with two sets of evenly dimensioned sides, including parallelograms, perfect squares, true rectangles, and others, unless explicitly narrowed to a particular form of rectangle.

Furthermore, as used herein, the term "rectangle" and the individual term "rectangular" refers to a (plane) figure with four straight sides and four right angles, with equal or with unequal adjacent sides. A rectangle is a quadrilateral with four right angles. It can also be defined as an equiangular quadrilateral, since equiangular means that all of its angles are equal ($360°/4=90°$). It can also be defined as a parallelogram containing a right angle.

As used in the specification and the appended claims, shapes designated by other common terms such as, for example, star-like, oblong, rhomboid, and others, refer to every other similar shape that one of ordinary skill in the art would consider to be similar, unless particularly narrowed to an explicit version of the shape. For example, an equal-sided five-pointed star, or a rhomboid with at least two equally dimensioned sides, and other specific forms.

B. Intake Manifold Assemblies

As described briefly above, the present disclosure relates, in various aspects, to devices and systems for an interchangeable intake manifold assembly.

The function of the intake manifold assembly is to allow air to reach an automobile engine, or any engine for that matter. Oxygen in the air is one of the necessary gases for the engine combustion process. A good air intake system allows for clean continuous airflow into the engine, thereby achieving more power and better mileage for an automobile. It is noted that interchangeable intake manifold assemblies as described herein are applicable to naturally-aspirated engines, super-charged engines, turbo-charged engines, and any engine using external air for a combustion process.

A modern car air intake system has three main components, amongst other components that vary among engine types. The first components include an air filter. The air filter removes debris and filters particulates to improve combustion. The air filter is usually a plastic or metal box in which the air filter resides. An additional component of a modern car air intake system is the mass flow sensor. The mass flow sensor is used to determine the mass of air entering of a fuel-injected internal combustion engine. From the mass flow sensor, air entering the vehicle travels through the throttle body. The throttle body is a portion of an air intake system that controls the amount of air flowing into an engine's combustion chamber. It consists of a housing that contains a throttle plate that rotates on a shaft or other pivot mechanism.

Located directly behind the front grill, an air intake system draws air into the air filter housing, and will be mixed with the car fuel. The air will be sent to the intake manifold that supplies the fuel/air mixture to the engine cylinders for appropriate combustion.

Figure 1B:
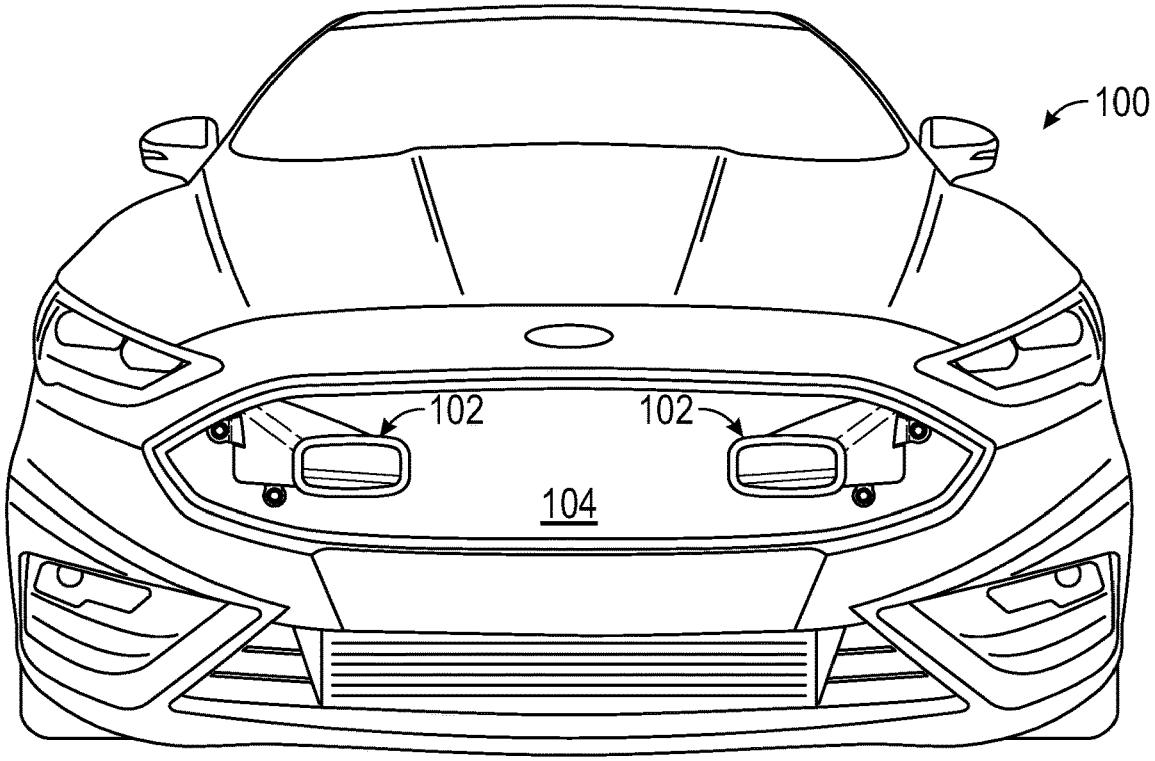
FIG. 1B illustrates a front view of the automobile of FIG. 1 with a grill portion removed for clarity of illustration, according to an exemplary embodiment.

Turning now to the drawings, FIG. 1a illustrates a front view of an automobile with an interchangeable intake manifold assembly installed thereon. As shown in FIG. 1 two interchangeable intake manifold assemblies have been installed rear of the forward intake grille 105, towards the left and right of the engine bay 104. Each interchangeable intake manifold assembly 102 includes a removable and interchangeable bell housing to change the appearance and the aesthetics of the automobile 100. For example, if main front grille 105 is removed, as shown in FIG. 1B, the placement of the interchangeable intake manifold assembly 102 are more readily visible.

Figure 2A:
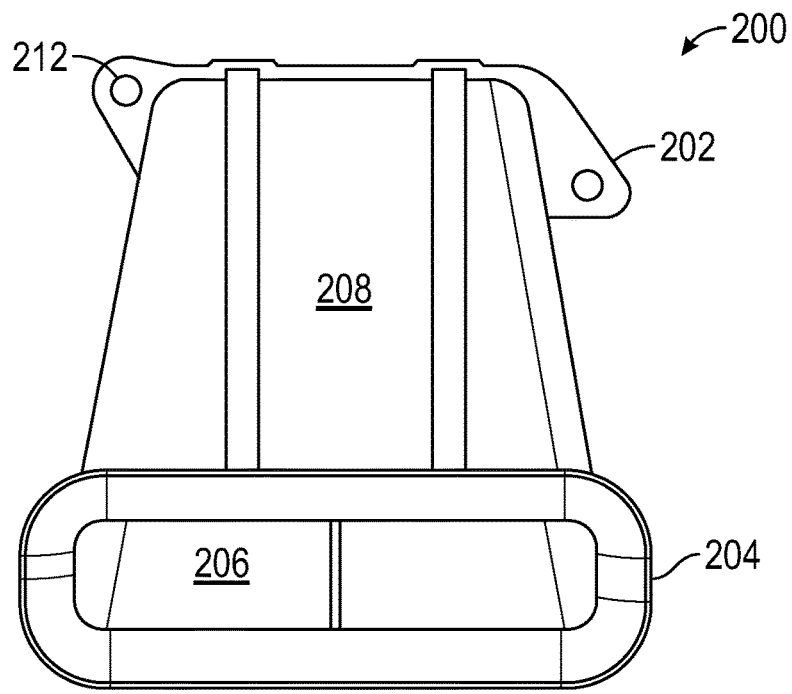
FIG. 2A illustrates a front view of an interchangeable intake manifold assembly, according to an exemplary embodiment.

FIG. 2a illustrates a front view of an interchangeable intake manifold assembly, according to an exemplary embodiment. As shown in FIG. 2A, the interchangeable intake manifold assembly 200 includes a base member 202 structurally attached to an exterior housing 208. The interchangeable intake manifold assembly 200 further includes a front bell housing 204 which is removable and interchangeable. Further, exterior housing 208 forms an interior cavity 206 to allow air to enter and be routed to a factory airbox.

The interchangeable intake manifold assembly 200 also includes fastener or aperture 212 arranged for allowing the fastening of the interchangeable intake manifold assembly 200 to a standard automobile, with a standard airbox, without structural modifications to the engine bay 104. It is noted that, according to some aspects, trimming of the shroud (e.g., see FIG. 3 and FIG. 4; 112) may be necessary to install the interchangeable intake manifold assembly 200 to an automobile 100.

Figure 2B:
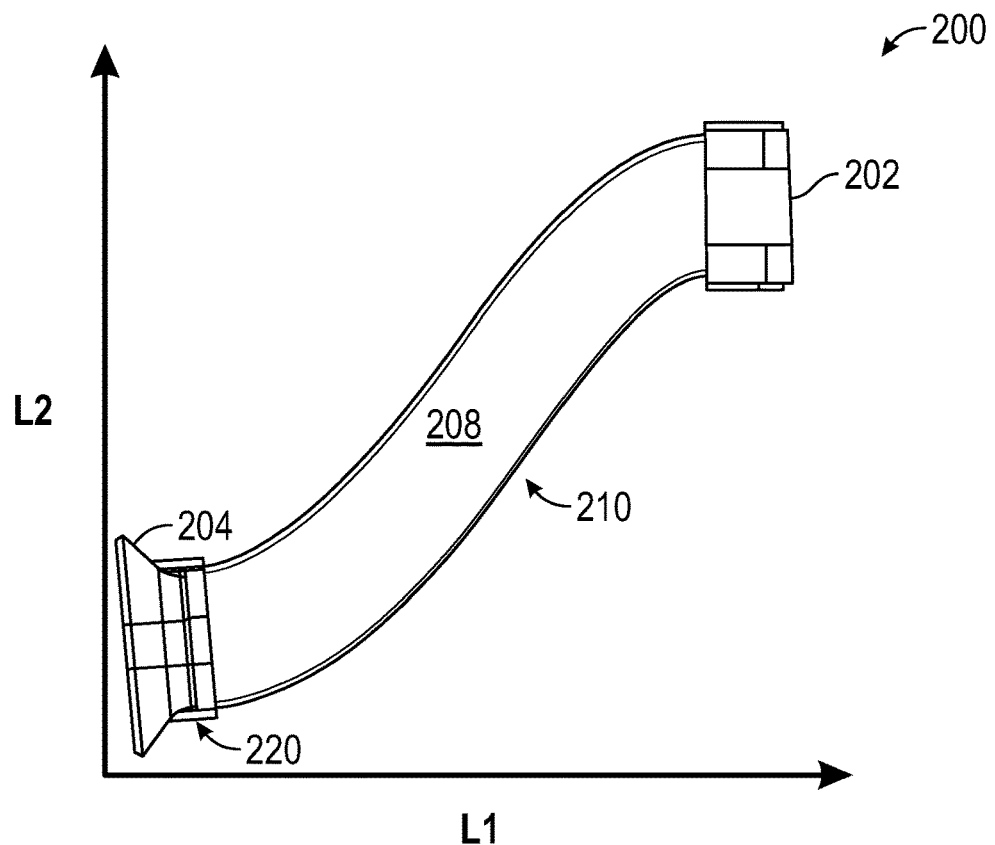
FIG. 2B illustrates a side view of an interchangeable intake manifold assembly, according to an exemplary embodiment.

FIG. 2B illustrates a side view of an interchangeable intake manifold assembly, according to an exemplary embodiment. As shown, the gooseneck portion 210 has an overall vertical height of L2 and a horizontal width of L1. The horizontal width L1 allows the interchangeable intake manifold assembly 200 to be installed on a standard automobile—no matter how forward of the engine—without requiring cutting to route the front bell housing 204 behind the front grille.

Furthermore, the scooping cross-sectional area of the forward bell housing 204 allows the collection of air which is then forcibly passed through the interior cavity 206 formed by the exterior housing 208 such that it exits at the standard base member 202 for entry into the car's intake manifold.

Figure 2C:
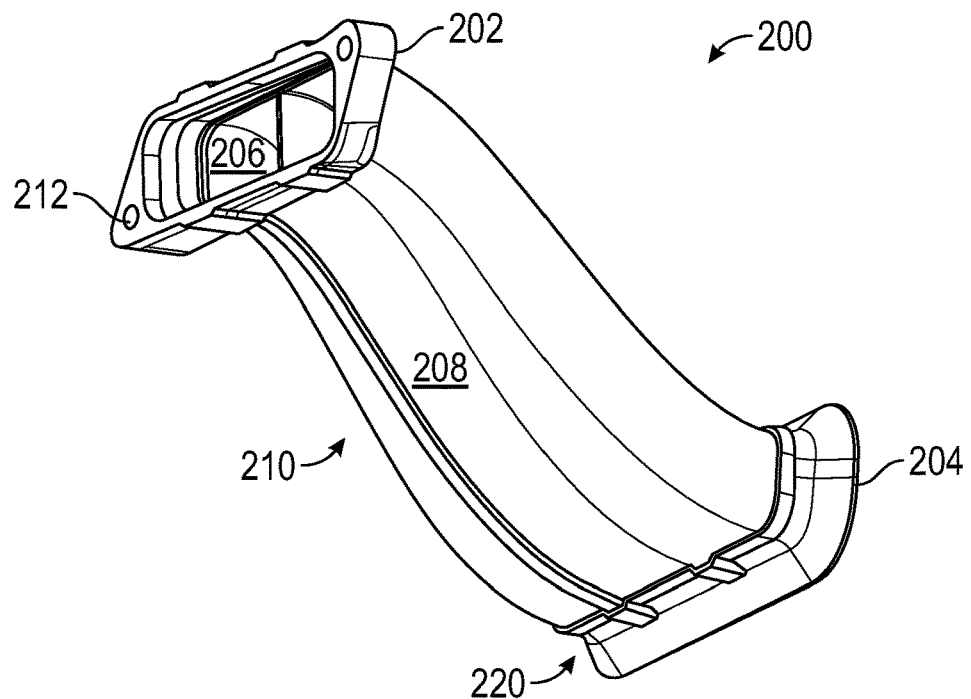
FIG. 2C illustrates a rear perspective view of an interchangeable intake manifold assembly, according to an exemplary embodiment.
Figure 2D:
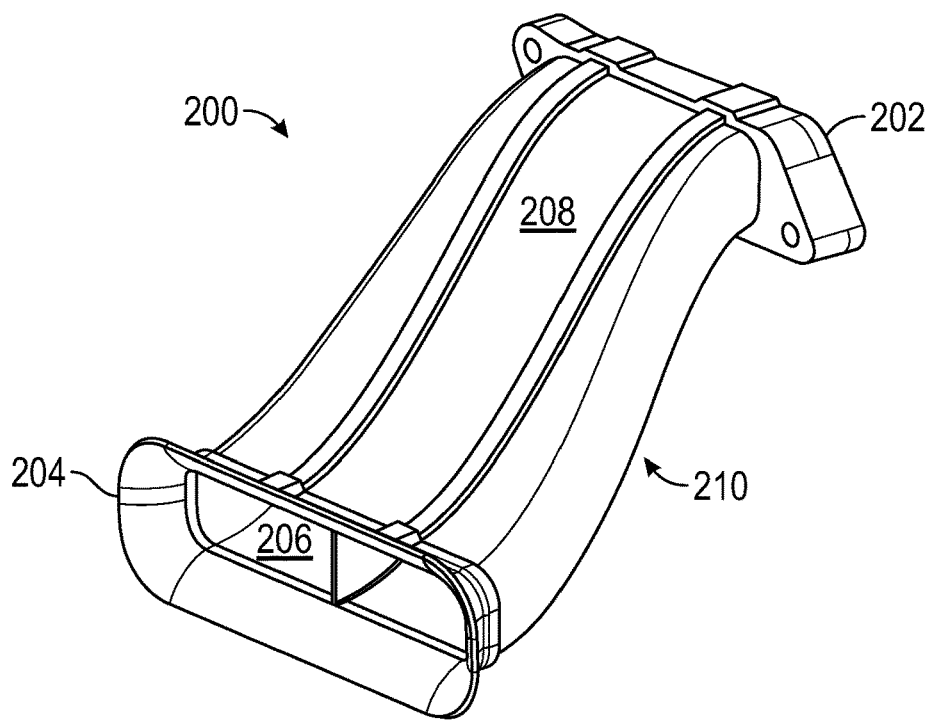
FIG. 2D illustrates a front perspective view of an interchangeable intake manifold assembly, according to an exemplary embodiment.

FIG. 2C illustrates a rear perspective view of an interchangeable intake manifold assembly, and FIG. 2D illustrate a forward perspective view of the interchangeable intake manifold assembly 200, according to an exemplary embodiment. As shown, the downward arrangement of gooseneck member 210 allows for readily increased airflow while also allowing customization through a user's choice of the forward bell housing 204.

Accordingly, as illustrated in FIGS. 2A-2D, the interchangeable intake assembly 200 includes the base member 202. The base member 202 is defined by a rectangular aperture configured to receive and engage an automobile intake airbox.

The base member 202 is also defined by a perimeter surrounding the rectangular aperture and having at least one fastener or aperture 212 configured to receive a fastener dimensioned to avoid disturbing the automobile intake airbox.

The gooseneck member 210 is or may be fixedly attached to the base member 202. Additionally, the gooseneck member 210 has a first end opening and a second end opening. The gooseneck member 210 also has an interior cavity 206 configured to direct air into the automobile intake airbox from the second end opening to the first end opening through the interior cavity (e.g., from bell housing 204 to base member 202).

The interchangeable intake manifold assembly 200 also includes the interchangeable bell housing 204. The bell housing 204 may be removably secured to the second end opening of the gooseneck member 210 and/or exterior housing 208. The bell housing 204 may have a frustoconical shaped cross section on at least one plane intersecting the bell housing 204 on an axis orthogonal to initial airflow. More specifically, the bell housing 204 is bell shaped along at least one plane. According to some aspects, the bell housing 204 is truly bell-shaped, at least in cross section, but may have many frontal shapes.

According to some embodiments, the rectangular aperture at the base member 202 includes at least one rounded corner. According to other embodiments, the rectangular aperture includes at least four rounded corners configured to directly engage a standard automotive airbox. For example, some automotive manufacturers include an airbox with four rounded corners having clips or pins to retain the factory bell housing. The rectangular aperture may be dimensioned to engage the exterior of this portion of the airbox and have rounded corners at least partially matching this profile.

As shown in FIG. 2C, the base member 202 can be further defined by having a generally rectangular shape encompassing the perimeter portion and fastener or aperture 212. This generally rectangular shape can be a rhomboid or parallelogram dimensioned to engage existing fasteners or apertures configured to receive fasteners existing in an automobile.

As shown in FIGS. 1A-1B, and with reference to FIG. 2C, the gooseneck member 210 can be dimensioned to support the interchangeable bell housing 204 to be visible external to an automobile. For example, visibility may be through a forward intake grille 105. Accordingly, in some embodiments, the phrase "visible external to the automobile" refers to visibility behind a forward intake grille 105 of the automobile 100.

With regard to construction, the base member 202 and/or the gooseneck member 210 can be formed of metal, plastic, fused metal, 3-D printed material, or rigid material. Other material compositions may also be applicable. For example, rigid or semirigid rubber or hardened elastomers may be used in some applications.

Furthermore, composite materials such as fiberglass or glass-reinforced resin or phenolic resin may be used. Still further, any rigid material capable of supporting the gooseneck member 210 and bell housing 204 may be applicable, as the interchangeable intake manifold assembly 200 is situated forward of the engine bay 104 and therefore not subject to typical engine temperatures in most applications.

Additionally, the interchangeable bell housing 204 may be formed of metal, plastic, injection-molded plastic, 3-D printed plastic, or a rigid material. The interchangeable bell housing 204 can also be formed of integrally formed colored material or coated in paint. For example, colorized plastic or rubber may be used in some applications. Still further, the integrally formed colored material or paint can be metallic or reflective.

Hereinafter, installation of an interchangeable intake assembly is described in detail. It is readily understood that alterations of the steps and/or methods of installation described may be applicable depending upon a particular model of automobile and/or whether the automobile is presently being modified and lacks some parts described below.

Figure 3:
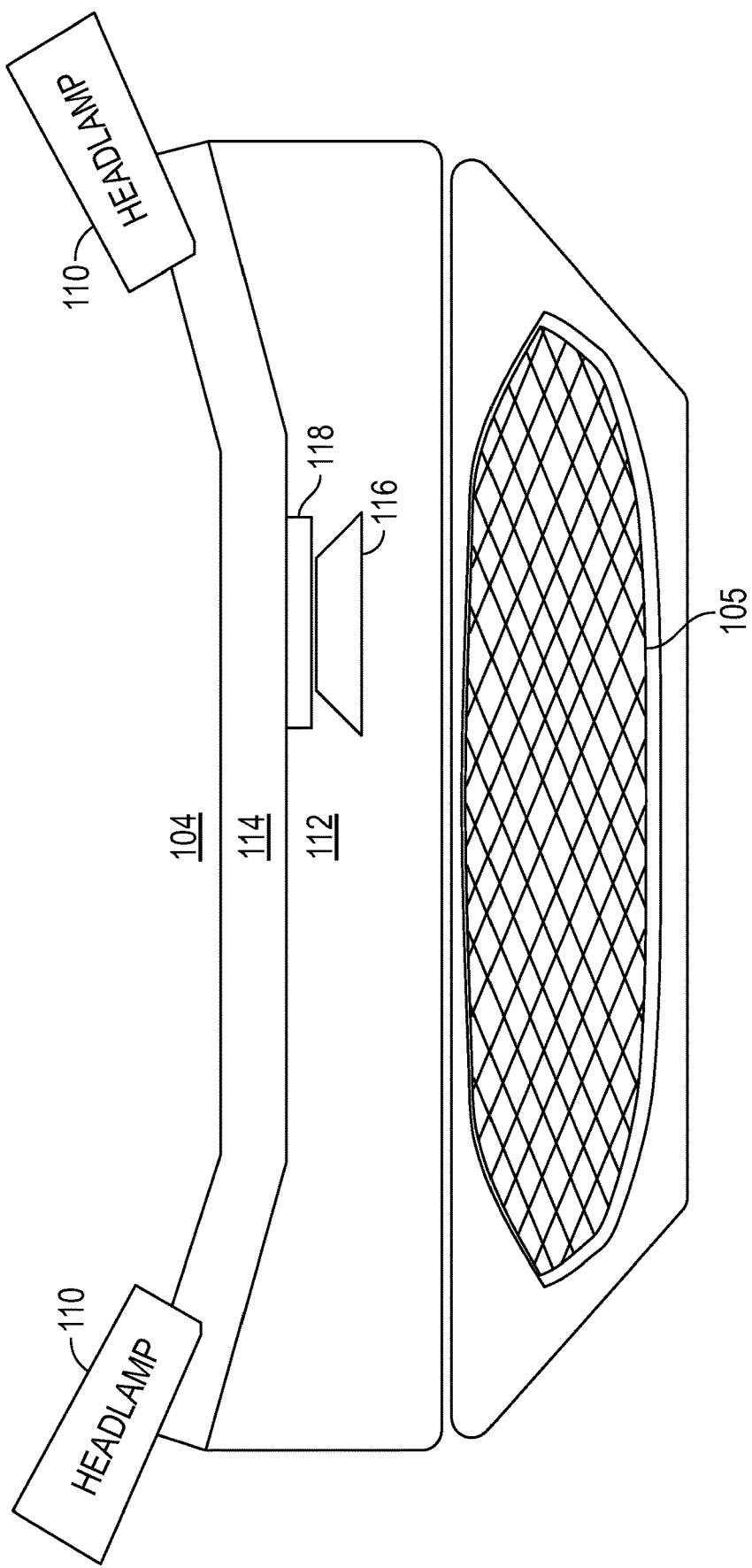
FIG. 3 illustrates an engine bay of an automobile prior to installation of an interchangeable intake manifold assembly, according to an exemplary embodiment.

FIG. 3 illustrates an engine bay of an automobile prior to installation of an interchangeable intake manifold assembly, such as interchangeable intake manifold assembly 200, according to an exemplary embodiment. The illustrated view of the engine bay 104 is a top-down perspective, showing the forward intake grille 105, the stock bell housing 116, and the stock automobile intake airbox 118. Additionally, some automotive manufacturers install a shroud 112 (e.g., plastic shroud) that may obstruct the view of the stock bell housing 116. Finally, structurally, the standard or stock automobile intake airbox 118 is supported through the forward cowl 114.

Headlamps 110 are generally towards the left and right of the forward cowl 114 and may be supported therefrom. Additionally, the forward intake grille 105 may initially obstruct the view of the stock bell housing 116. Thus, the forward intake grille 105 and shroud 112 may be removed for better access to remove stock components and/or replace stock components.

Figure 4:
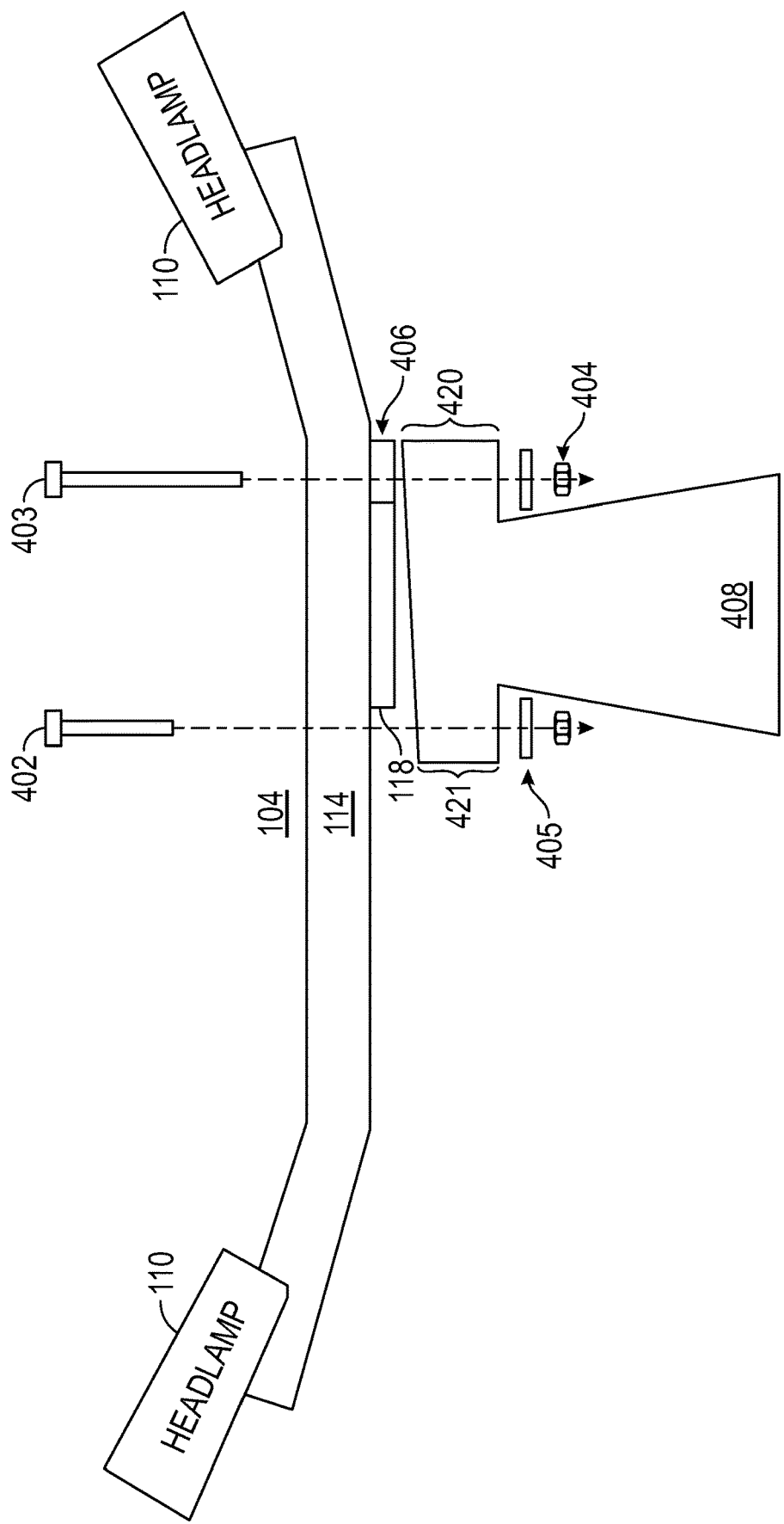
FIG. 4 illustrates an engine bay of an automobile during installation of an interchangeable intake manifold assembly, according to an exemplary embodiment.

FIG. 4 illustrates an engine bay of an automobile during installation of an interchangeable intake manifold assembly, such as interchangeable intake manifold assembly 200, according to an exemplary embodiment. As illustrated, two or more fasteners 402 and 403 are passed adjacent to the stock automobile intake airbox 118. Furthermore, a spacer component or spacer assembly 406 is included to receive the fastener 403.

The spacer allows the gooseneck member of an interchangeable intake manifold assembly to be appropriately situated due to the trapezoidal cross-section of the standard base member 202, denoted by 420 and 421. Upon mounting, spacer washer 405 and or fastener nut 404 may be tightened amongst fasteners 402, and 403 to finish installation. After installation, the interchangeable intake manifold assembly 408 may be customized using an interchangeable front bell housing, such as any bell housing described herein.

Figure 5:
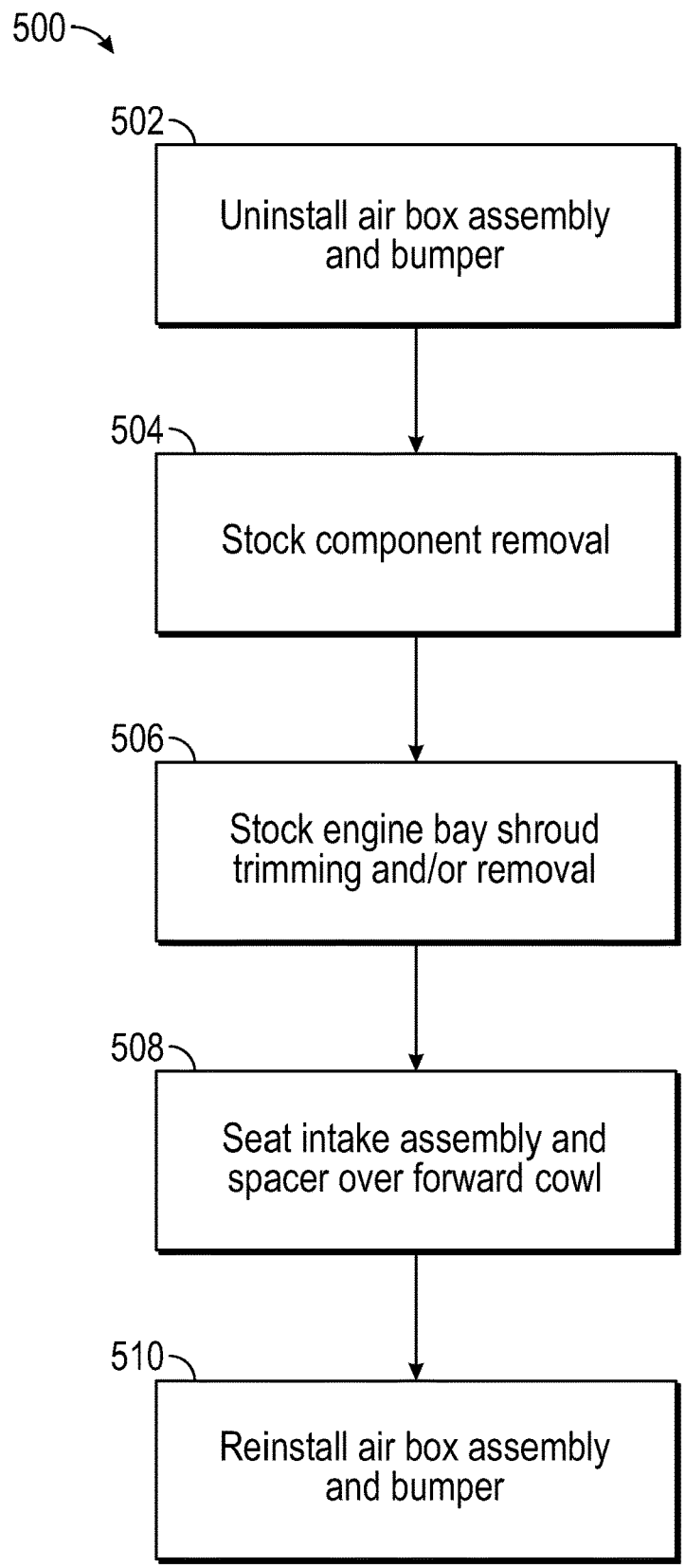
FIG. 5 is a flowchart of a method of installing an interchangeable intake manifold assembly, according to an exemplary embodiment.
Figure 6:
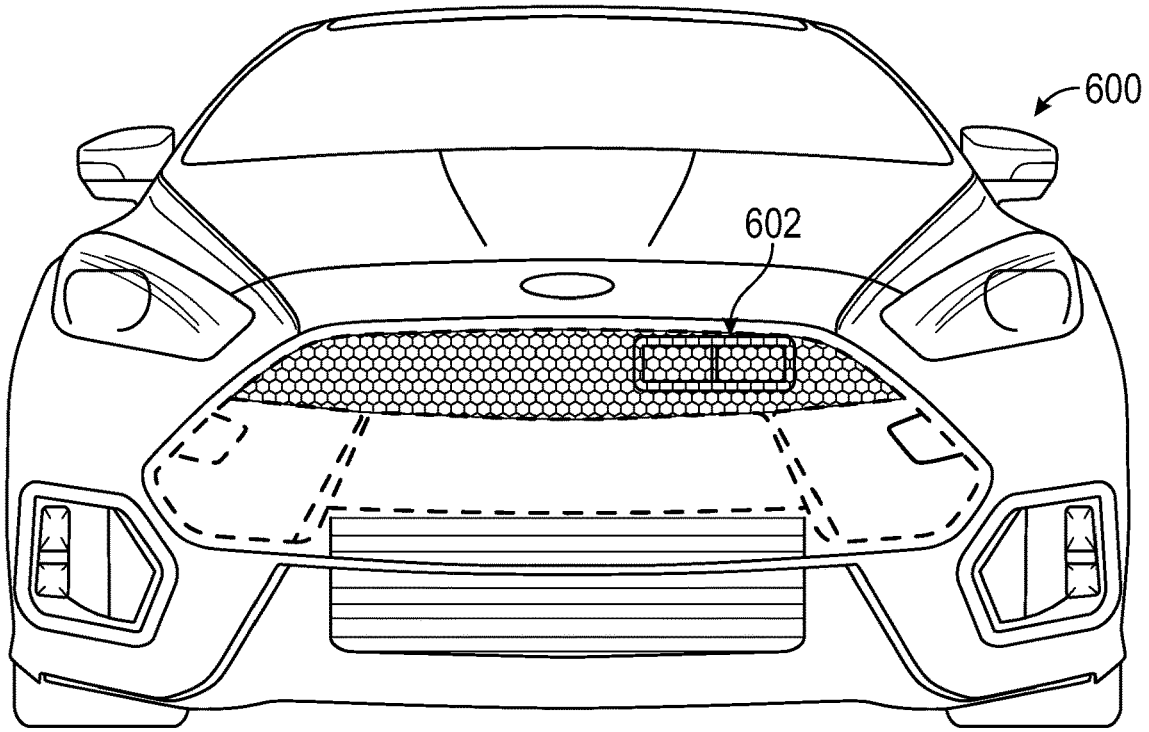
FIG. 6 illustrates a front view of an automobile with an interchangeable intake manifold assembly installed thereon, according to an exemplary embodiment.
Figure 7:
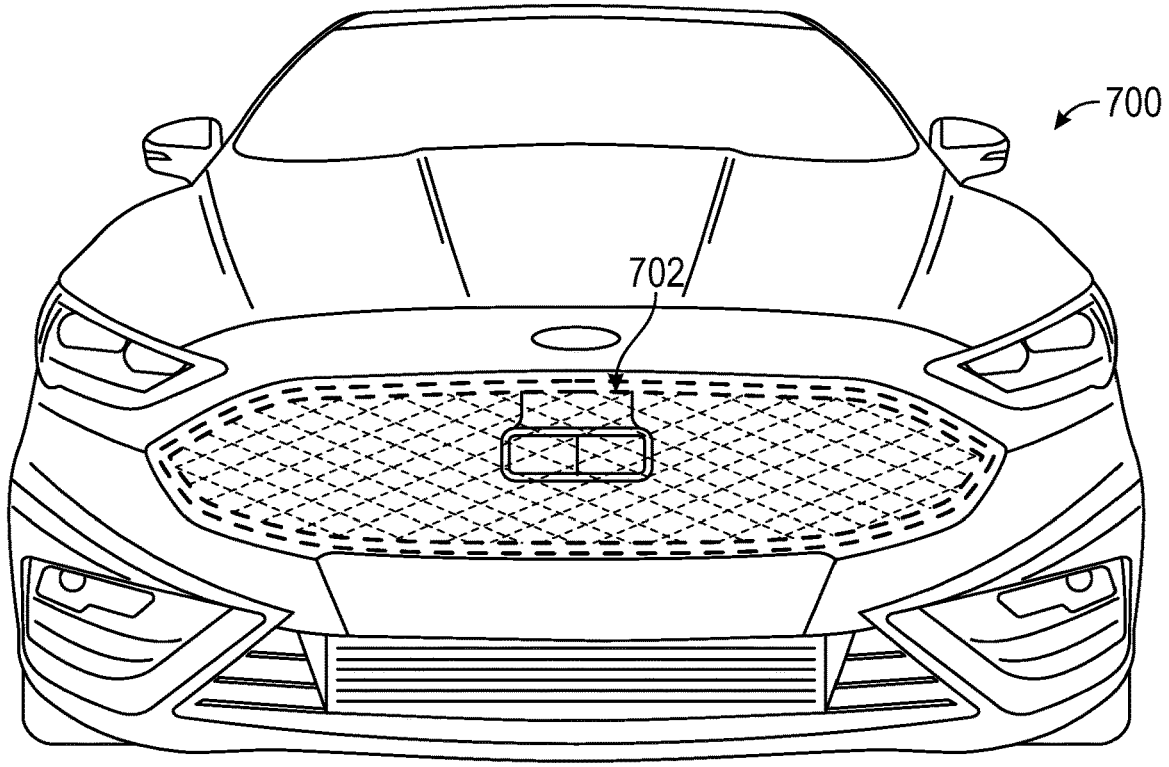
FIG. 7 illustrates a front view of an automobile with an interchangeable intake manifold assembly installed thereon, according to an exemplary embodiment.
Figure 8:
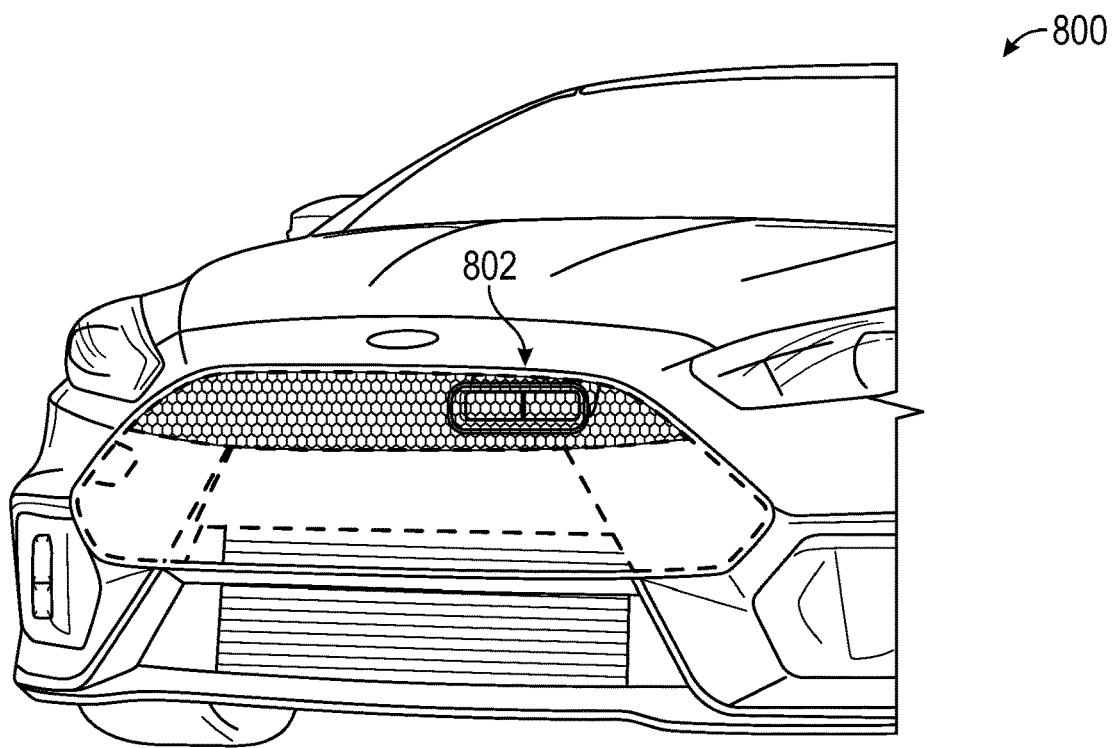
FIG. 8 illustrates a front view of an automobile with an interchangeable intake manifold assembly installed thereon, according to an exemplary embodiment.
Figure 9:
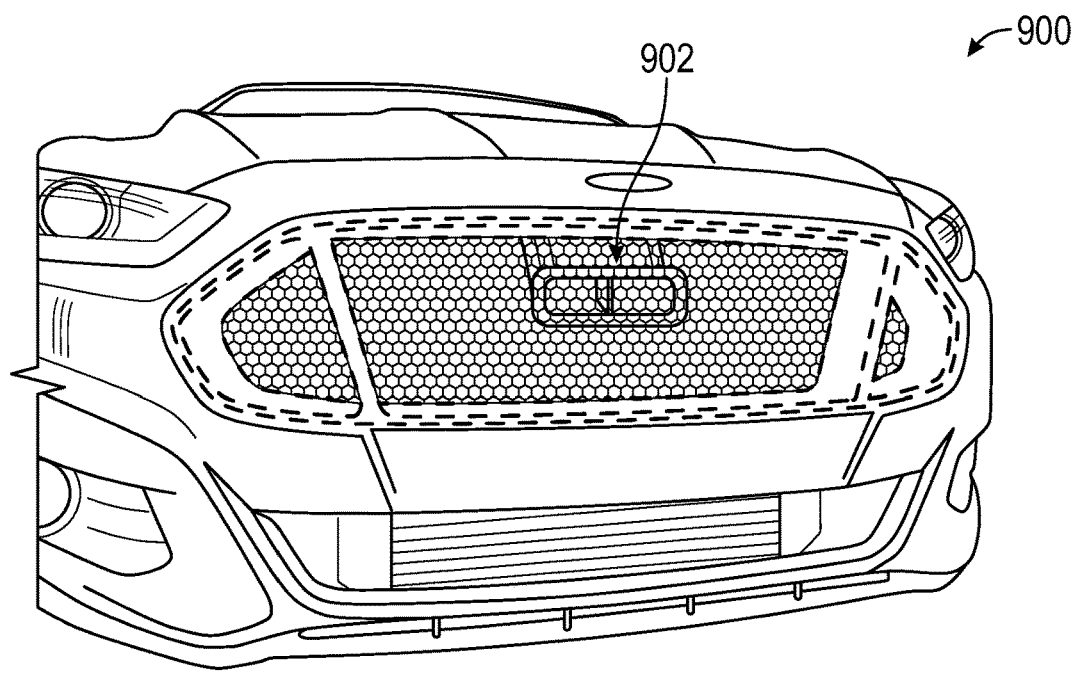
FIG. 9 illustrates a front view of an automobile with an interchangeable intake manifold assembly installed thereon, according to an exemplary embodiment.

FIG. 5 is a flowchart of a method 500 of installing an interchangeable intake manifold assembly, according to an exemplary embodiment. The method 500 includes uninstalling a stock automobile intake airbox and front bumper/forward grille of an automobile at block 502. Upon access to the stock automobile intake airbox, the method 500 includes stock component removal of the factory or stock bell housing, at block 504.

The method 500 further includes trimming and/or removal of a stock engine bay shroud, if a user desires, at block 506. Thereafter, the method 500 includes seating the new interchangeable intake manifold assembly and spacer over the forward cowl utilizing the fasteners 402 and 403.

The method 500 further includes reinstalling an automobile intake airbox or assembly (if removed, and rearward of the base member 202) and front bumper or any decorative items removed from the front of the automobile, at block 510.

As illustrated in FIGS. 6-9, multiple physical locations for different interchangeable air intake assemblies 602, 702, 802, 902 may be chosen by a user of automobiles 600, 700, 800, and 900, depending on the aesthetic design and location of the stock automobile intake airbox.

Figure 10:
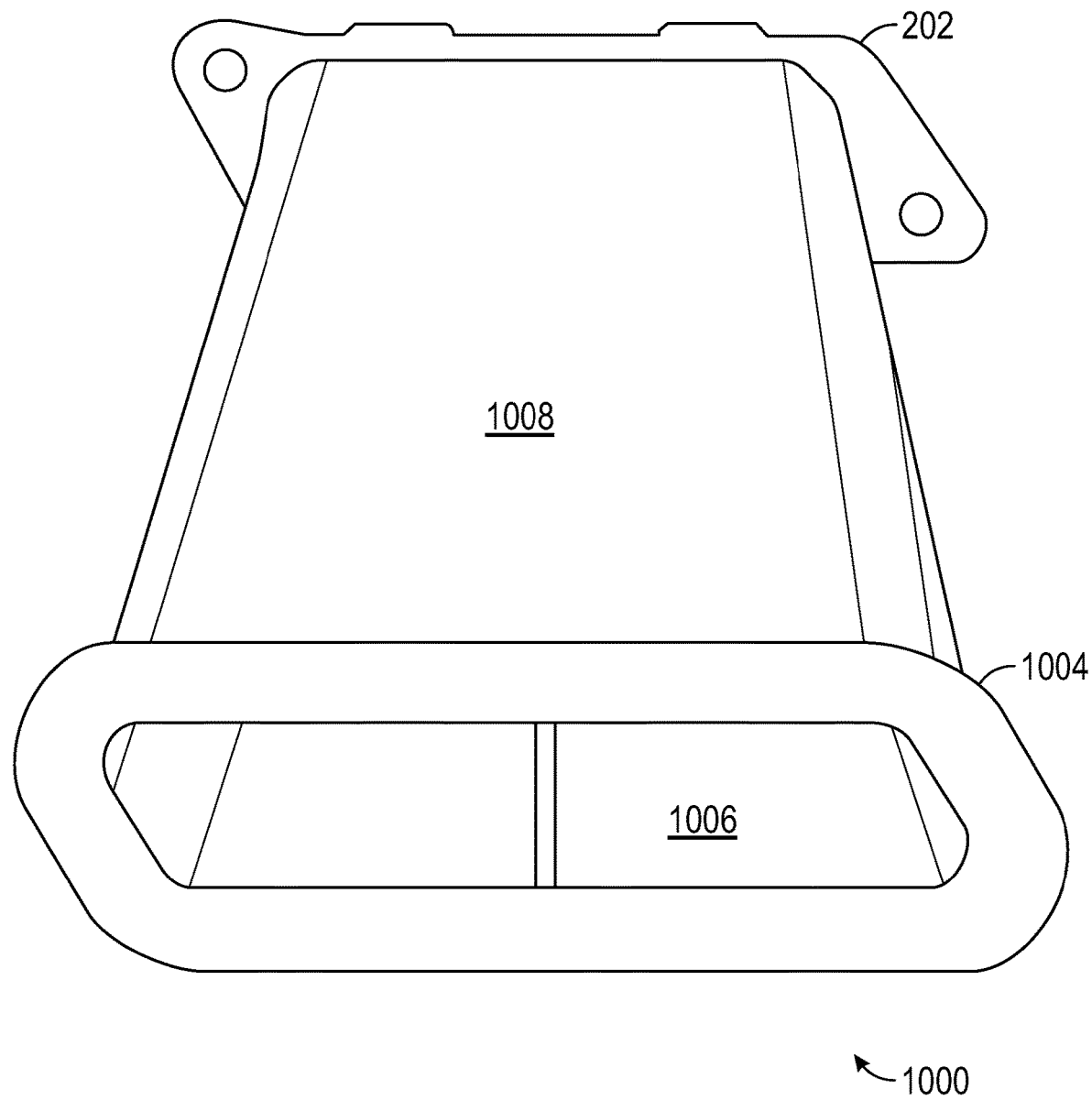
FIG. 10 illustrates a front view of an interchangeable intake manifold assembly, according to an exemplary embodiment.

FIG. 10 illustrates a front view of an interchangeable intake manifold assembly, according to an example embodiment. As shown in FIG. 10, the interchangeable intake manifold assembly 1000 includes a common base member 202. Common base member 202 may be fixedly attached to exterior housing 1008. The exterior housing 1008 defines an interior cavity 1006 to receive intake air directed by the bell housing 1004.

Although the bell housing 1004 has a general parallelogram shape, it may be interchanged with several different bell housings to change the look, appearance, and aesthetics of a vehicle that it is installed in.

Figure 11:
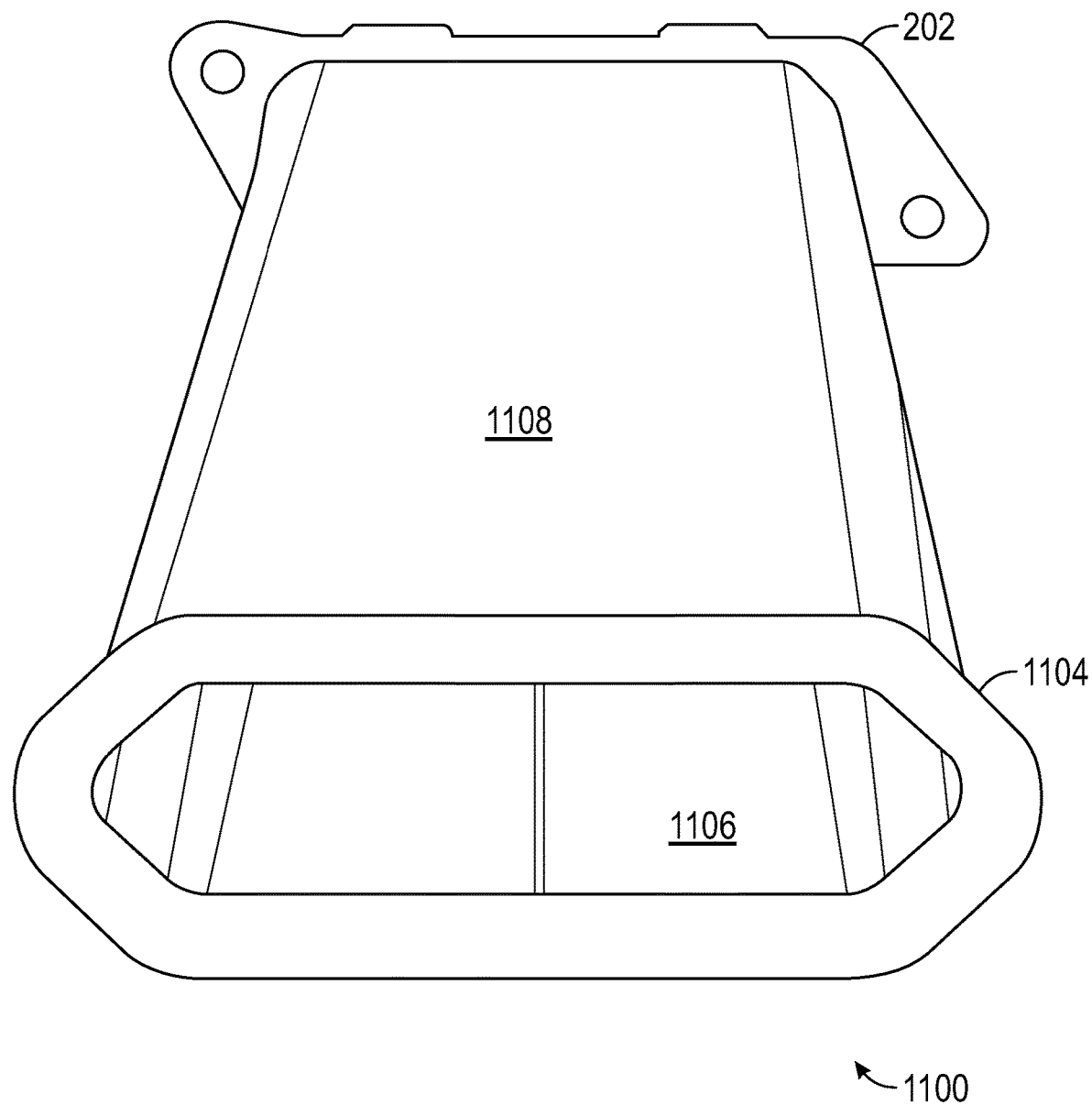
FIG. 11 illustrates a front view of an interchangeable intake manifold assembly, according to an exemplary embodiment.

For example, FIG. 11 illustrates a front view of an interchangeable intake manifold assembly 1100. Interchangeable intake manifold assembly 1100 also includes the common base member 202, with the exterior housing 1108 fixedly attached thereto.

The exterior housing 1108 includes or defines an interior cavity 1106 configured to receive ram air from the bell housing 1104.

Figure 12:
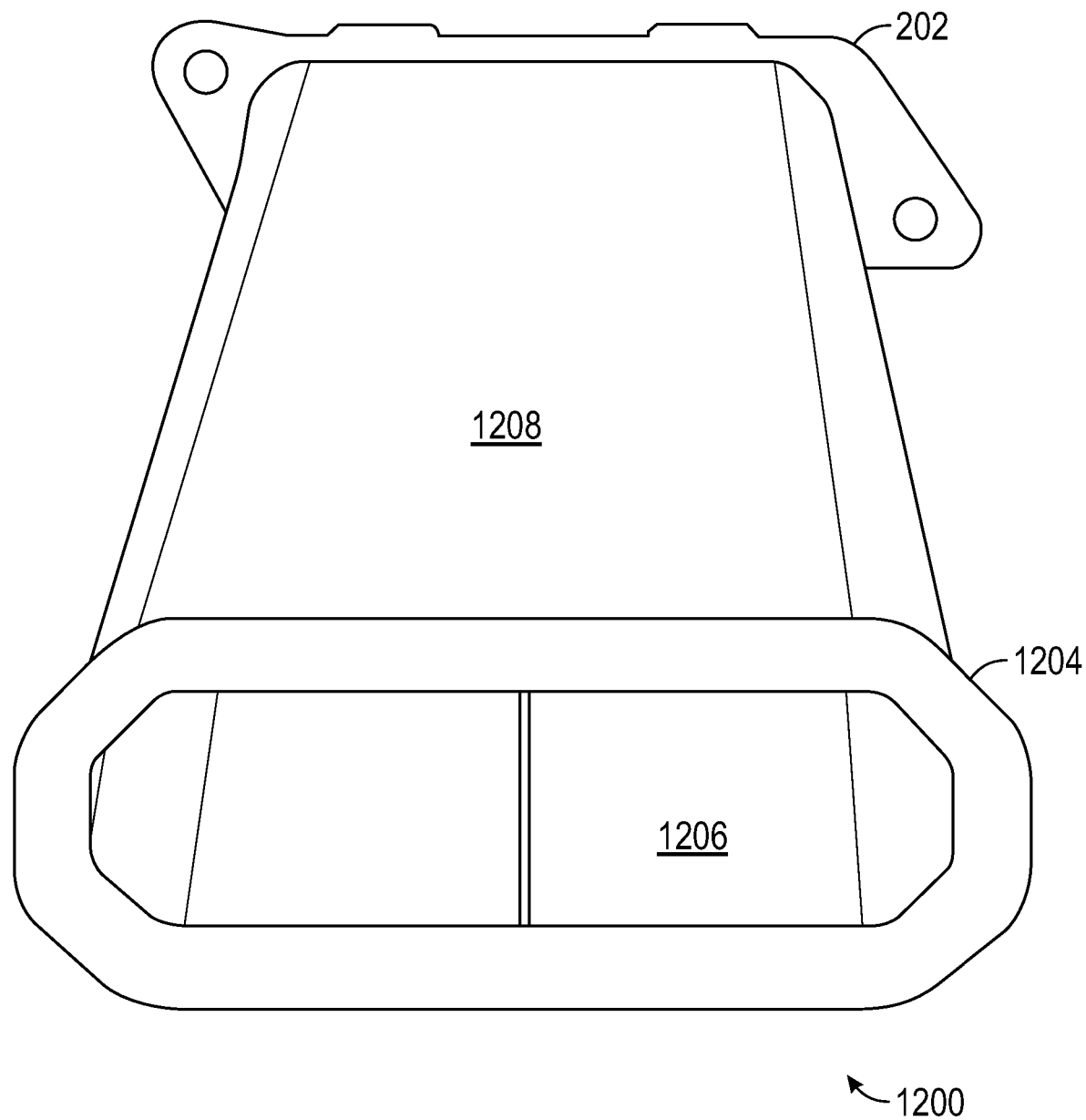
FIG. 12 illustrates a front view of an interchangeable intake manifold assembly, according to an exemplary embodiment.
Figure 13:
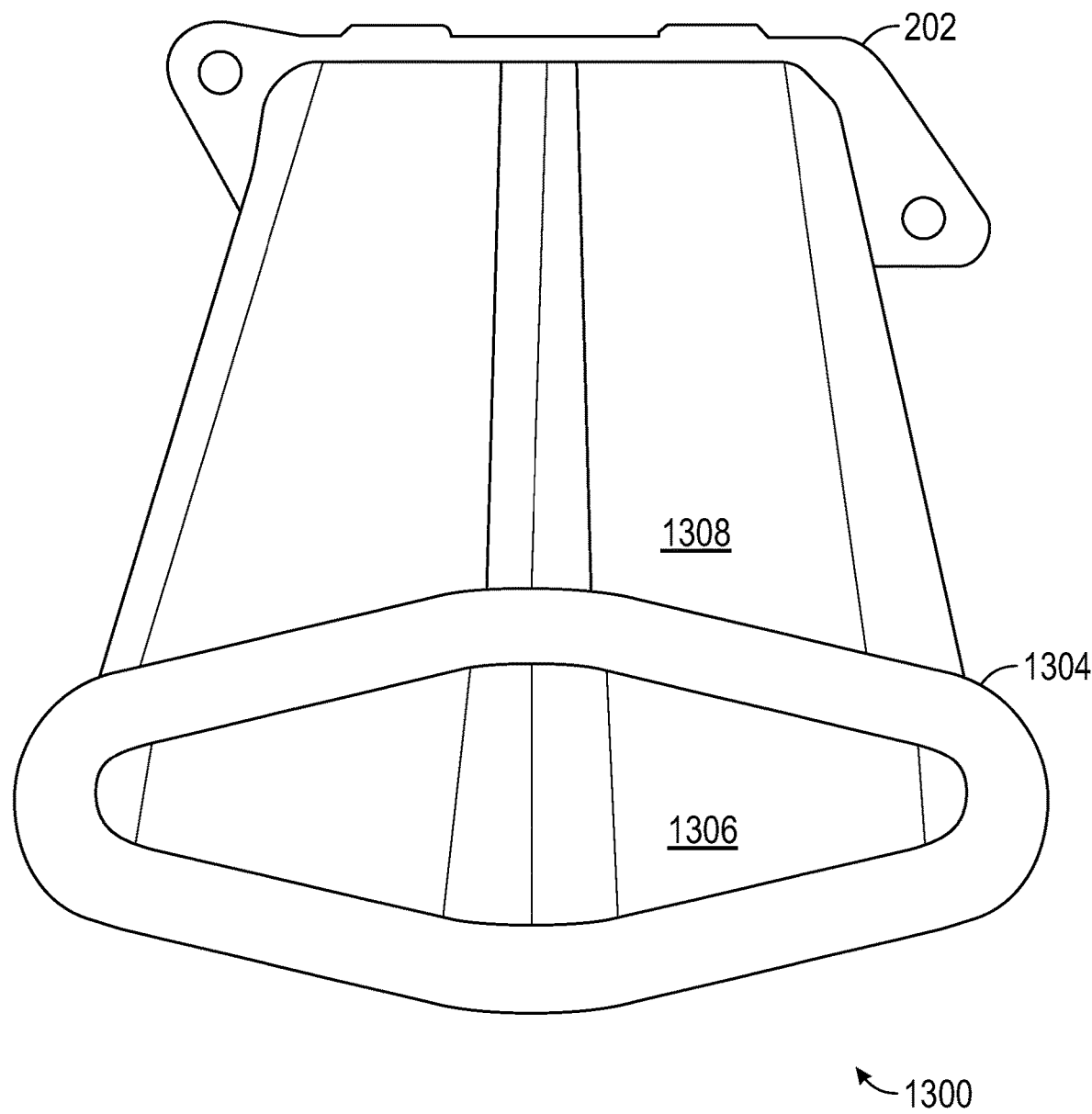
FIG. 13 illustrates a front view of an interchangeable intake manifold assembly, according to an exemplary embodiment.

The bell housing 1104 is fully interchangeable without further modifications to the bell housing 1004. For example, as illustrated in FIGS. 12 and 13, each interchangeable intake manifold assembly includes the common base member 202 and the exterior housing 1208, 1308 fixedly attached thereto, which further defines an interior cavity 1206, 1306. The exterior housings 1208, 1308 are each configured to receive any of the bell housings 1004, 1104, 1204, 1304.

Moreover, additional designs and shapes are also possible. For example, additional bell housings can include virtually any shape, including but not limited to, rhomboids, perfect squares, rectangles, triangles, diamond shapes, star patterns, oblong or egg shapes, and any other suitable shape configurable to be attached to an exterior housing at least somewhat similar to exterior housing 1008, 1108, 1208, and/or 1308.

Turning now to FIG. 14 an additional front view of an interchangeable intake manifold assembly 1400 is illustrated. The interchangeable intake manifold assemblies 1400 are configured to be installed in a dual intake manifold system. The common backup base members 1402 may be fixedly attached to exterior housings 1408. Exterior housings 1408 are configured to receive a bell assembly or bell intake 1404 such that air is directed to interior cavities 1406, and further is received by the intake manifold(s) of an automobile.

As illustrated in FIGS. 15-17, additional shapes and configurations of intake manifold assemblies are possible.

For example, as illustrated in FIG. 15, common base member 1502 is shared across interchangeable intake manifold assemblies 1500. As such, bell housings or ram air intakes 1504 and 1604 may be readily interchanged across the interchangeable intake manifold assemblies illustrated in FIG. 14, FIG. 15, and FIG. 16.

As shown in FIG. 17, additional forms of interchangeable intake manifold assemblies are available for different models of automobile. Interchangeable intake manifold assembly 1700 is configured for use in automobile with dual intakes and restricted space for installation.

For example, the interchangeable intake manifold assembly 1700 comprises a base member 1702, support structures 1710 and 1711, exterior housing 1708, which further defines an interior channel 1706 configured to receive ram air intake external to the automobile. Furthermore, as described further herein, interchangeable bell housing 1704 may be exchanged with any other shape bell housing to alter the appearance, aesthetics, and aggressive profile as desired by a consumer.

According to various further aspects of the invention, FIGS. 18-29 illustrate several embodiments of interchangeable intake manifold assemblies with interchangeable or replaceable bell or flare housings. These figures illustrate non-limiting examples of embodiments of components for the disclosed assemblies, housings, devices and systems. Although the components are disclosed with specific functionality or features, it should be understood that functionality or features may be shared between components, with some functions split between components, while other functions duplicated by the components. Furthermore, the name of the components should not be construed as limiting upon the functionality of the components. Moreover, each stage in the claim language can be considered independently without the context of the other stages. Each stage may contain language defined in other portions of this specifications. Each stage disclosed for one component may be mixed with the operational stages of another component. Each stage can be claimed on its own and/or interchangeably with other stages of other components.

As used herein, an interchangeable flare housing (which in some embodiments may also be referred to herein as a bell housing) refers to a component or structure defining an opening and configured to removably attached to ducting or tubing for directing air therethrough. For example, and without limitation, the flare housing may be configured to attach to a manifold body or tubing, such as, an opening of a disclosed gooseneck member and/or exterior housing. The flare housing may use various securing mechanisms or means for attach to or coupling with ducting or tubing. In still further aspects, the securing mechanism or securing means can comprise a fitting, insert, adhesive, mechanical fastener, spring loaded locking, magnet, adhesive, threading, friction fit, hook and groove snap-fit, twist-lock, tab and groove, tab and slot, latch, strap, pin, clasp, screwing mechanism, a click-lock mechanism, or friction mechanism or interlocking mechanism, or combinations thereof. In various embodiments, the flare housing may use a mechanical fastener (e.g., through-bolt, set screw, bolt, etc.) to achieve a strong connection between the interchangeable intake manifold assembly and interchangeable flare housing. In some embodiments, the interchangeable flare housings have a frustoconical shaped cross section on at least one plane.

While embodiments of the interchangeable flare housings in FIGS. 18-29 may be shown coupled to the interchangeable intake manifold assemblies using various example securing mechanisms, it should be understood by one having ordinary skill in the art that the present disclosure is not limited to these securing mechanism (e.g., fasteners) and can include any desired securing mechanism or means for coupling and holding components together.

As shown herein, a flare housing of the present is generally constructed in the shape of a three-dimensional polygon with apertures or mouths at opposed ends configured for air to travel therethrough. In further aspects, the housing walls or sides define an exterior surface and interior cavity for air travel. Any other shape (as used herein, the term shape is used in the broad sense of three-dimensional works) may be employed, so long as the shape is large enough and structured so as to be able to attach to a manifold assembly or like ducting as more fully disclosed herein. In some aspects, the interior cavity defined by the housing walls or sides is a single cavity or compartment for air travel. In other aspects, the interior cavity defined by the housing walls or sides comprises no more than two cavities or compartments for air travel.

In further aspects, the flare housing may have a first portion having a first three-dimensional polygon shape and at least one other portion having the same or a different three-dimensional polygon shape. In still further aspects, the flare housing may have a first portion having a first three-dimensional polygon shape and a second portion having a different three-dimensional polygon shape. In even further aspects, the flare housing may have a first portion having a first three-dimensional polygon shape and a plurality of other portions having different three-dimensional polygon shapes. In yet further aspects, the three-dimensional polygon shape may include at least one of the following: a frustoconical shape or substantially frustoconical shape, a frustopyramidal shape or substantially frustopyramidal shape, a frustocylindrical shape or substantially frustocylindrical shaped, a box shape or substantially box shape, a frustopolyhedrical shape or substantially frustopolyhedrical shape, an asymmetrical frustopolyhedrical shape or substantially asymmetrical frustopolyhedrical shape, a frustooctagonal-pyramidal shape or substantially frustooctagonal-pyramidal shape, and an asymmetrical frustooctagonal-pyramidal shape or substantially asymmetrical frustooctagonal-pyramidal shape, or combinations thereof.

For example, in some embodiments, the flare housing may include a first portion having a substantially rectangular tubular shape, and a second portion having a substantially frustopyramidal shape. In such embodiments, the flair housing, and portions thereof, may comprise distinct lateral, top, and bottom sides. Opposing sides (e.g., lateral sides) may be the same and/or substantially the same size and shape, and each may include at least one planar section and/or a curved section. In further aspects, each side may include one or more distinct faces and/or surfaces. For example, a side may include a single planar and optionally include a curved section connecting adjacent sides or at the junction where adjacent sides meet. In some aspects, such as for example, portions with a substantially rectangular tubular shape, the top side may be a single planar section and may be parallel or substantially parallel with the bottom side. In other aspects, such as for example, portions with a substantially frustopyramidal shape, the top side may comprise a planar section on a plane that intersects with a plane of the bottom side at an angle of from about 30 degrees to about 165 degrees, for example about 30, 45, 60, 75, 90, 105, 120, 135, 150, or 160 degrees. The depth of the flare housing may be the distance from a front edge to a rear edge, the width may be the distance between lateral sides, and the height may be the distance between a top side and a bottom side.

In other embodiments, the flare housing may include a first portion having a substantially cylindrical shape, and a second portion having a substantially frustoconical shape. In such embodiments, the flair housing, and portions thereof, may comprise a single circular side.

In still further aspects, the interchangeable flare may have at least one of the following on at least one plane: a frustoconical shaped or substantially frustoconical shaped cross section, a frustopyramidal shaped or substantially frustopyramidal shaped cross section, a frustocylindrical shaped or substantially frustocylindrical shaped cross section, a box shaped or substantially box shaped cross section, a frustopolyhedrical shaped or substantially frustopolyhedrical shaped cross section, an asymmetrical frustopolyhedrical shaped or substantially asymmetrical frustopolyhedrical shaped cross section, a frustooctagonal-pyramidal shaped or substantially frustooctagonal-pyramidal shaped cross section, and an asymmetrical frustooctagonal-pyramidal shaped or substantially asymmetrical frustooctagonal-pyramidal shaped cross section, or combinations thereof.

In further aspects, a first portion of the flare housing may correspond to or otherwise comprise an attachment area for coupling with or attaching to the manifold assembly, i.e., a mouth of the manifold body, an opening of a disclosed gooseneck member and/or exterior housing, or similar ducting structure. In still further aspects, a second (or other) portion of the flare housing may correspond to a flare portion or otherwise comprise a flare area where the mouth flares out and increases the intake area. In some aspects, the second (or other) portion of the flare housing or flared portion does not comprise an attachment area or mechanism for coupling.

In further aspects, a flare housing may further comprise an opening through the housing wall for providing a lighting source, such as an LED light unit, on a surface or region interior to the outermost surface of the flare housing. A light (and/or sound) may be turned on when the vehicle ignition is initiated and turned off when power to the vehicle is turned off. Alternatively, the lighting element may be under a control that is separate from a control for the vehicle. Various device components, such as switches, control elements, such as a polycarbonate circuit board and the programming to accomplish the disclosed activities and others, and elements such as timing elements, sound elements and lights, are known, and can be selected or commercially acquired by those of skill in the art. Wires for connecting the elements within the housing are contemplated by the present invention.

In further aspects, a lighting source can be any conventional lighting source or means for producing illumination. In still further aspects, a controlling or on/off switch can be used, which may be a common switch or a push button on/off switch, and can be used to control operation of the lighting source, such as to turn the lighting source on and off. In some aspects, as further described herein, the lighting source and other device elements may be remotely activated, such as, for example by a remote switch or wireless device, or activated by a component other than a mechanical on/off switch. In further aspects, an activated lighting source may illuminate in a constant and continuous mode, or the illuminations may be noncontinuous, such as intermittent periods or cycles of illumination and no illumination. The power source for operating the lighting source can be any type of power source such as but not limited to a connection to a battery, such as an automotive battery, a solar or other light cell, a miniature reactor, a mechanical source such as a flywheel or springs, a disposable or rechargeable battery or the like.

Figure 18C:
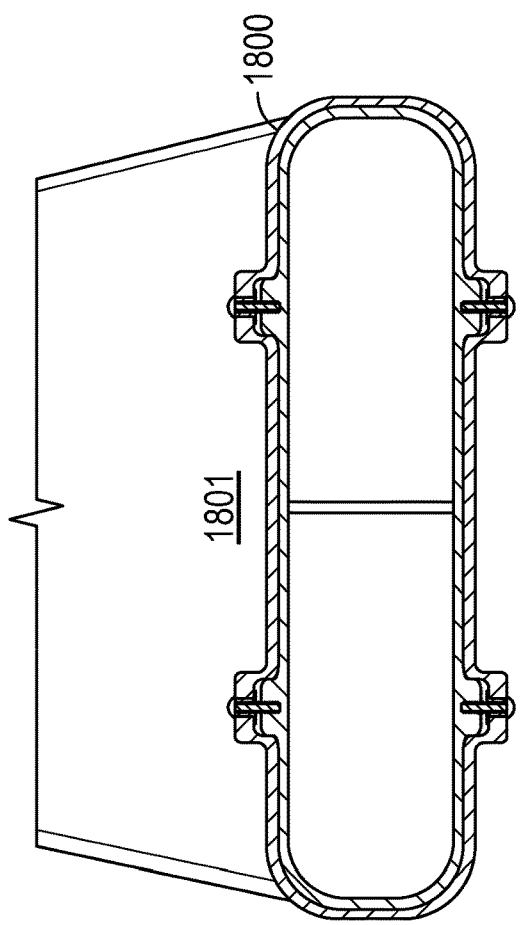
FIG. 18C illustrates a front view of the interchangeable intake manifold assembly with the interchangeable flare housing fastened together by the through-bolt coupling, according to an exemplary embodiment.
Figure 18D:
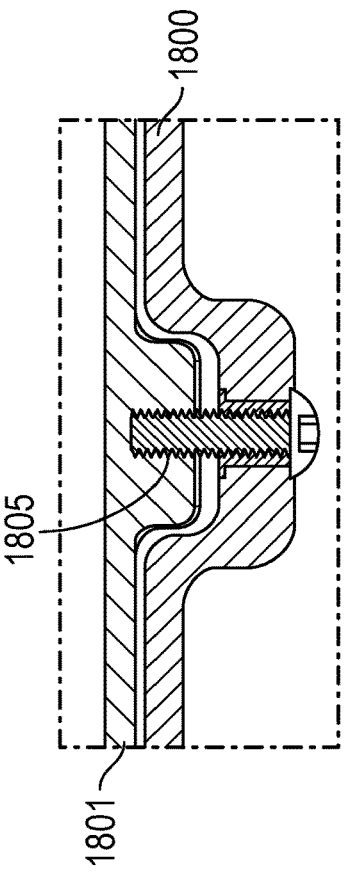
FIG. 18D illustrates a front sectional view of the interchangeable intake manifold assembly with the interchangeable flare housing fastened together by the through-bolt coupling, according to an exemplary embodiment.
Figure 18A:
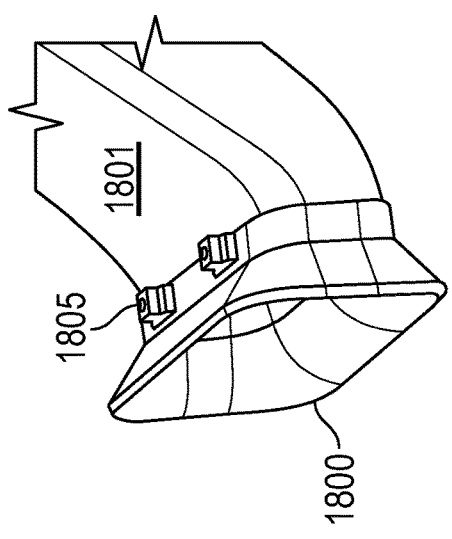
FIG. 18A illustrates a perspective view of an interchangeable intake manifold assembly with an interchangeable flare housing fastened together by a through-bolt coupling, according to an exemplary embodiment.

FIGS. 18A-D illustrate various views of interchangeable intake manifold assembly 1801 with interchangeable flare housing 1800 in accordance with an embodiment of the present invention. FIG. 18A illustrates a perspective view of an interchangeable intake manifold assembly 1801 with an interchangeable flare housing 1800 fastened together by a through-bolt coupling 1805, according to an exemplary embodiment. In one embodiment, through-bolt coupling 1805 may be substituted with one or more through-rivets. Interchangeable flare housing 1800 includes a first portion having a substantially rectangular tubular attachment area in the form of flange 1803 with mating components 1805, and a substantially frustopyramidal shaped second portion extending therefrom.

Figure 18B:
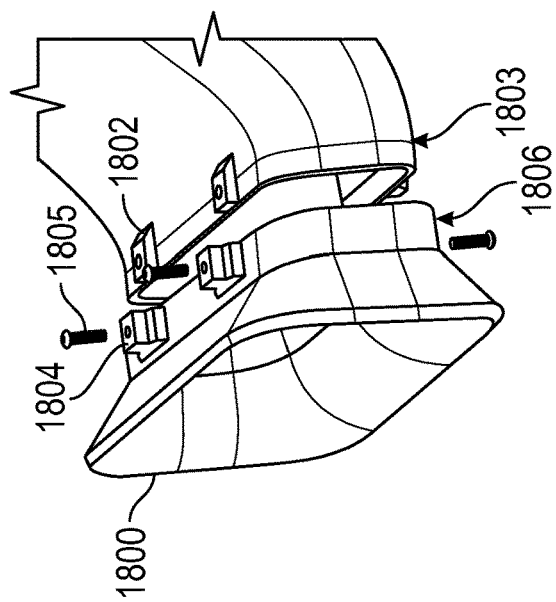
FIG. 18B illustrates a perspective exploded view of the interchangeable intake manifold assembly with the interchangeable flare housing fastened together by the through-bolt coupling, according to an exemplary embodiment.

FIG. 18B illustrates a perspective exploded view of the interchangeable intake manifold assembly 1801 with the interchangeable flare housing 1800 fastened together by the through-bolt coupling 1805, according to an exemplary embodiment. As shown, a through-bolt coupling 1805 may be inserted (e.g., screwed) into mating components 1802, 1804 of the interchangeable intake manifold assembly 1801 and interchangeable flare housing 1800, respectively. In some embodiments, the mating components 1802, 1804 are disposed on the respective flanges 1803, 1806. Flanges 1803, 1806 have threaded holes therein to receive the through-bolt coupling 1805. It is noted that through-bolt coupling 1805 inserted into mating components 1802 and 1804 may fasten the interchangeable intake manifold assembly 1801 to the interchangeable flare housing 1800 as to not require an adhesive and/or further securing means to ensure through-bolt coupling 1805 does not become unfastened (e.g., back out) from mating components 1802 and 1804 due to vibration and/or other factors that may cause unfastening.

FIG. 18C illustrates a front view of the interchangeable intake manifold assembly 1801 with the interchangeable flare housing 1800 fastened together by the through-bolt coupling, according to an exemplary embodiment. FIG. 18D illustrates a front sectional view of the interchangeable intake manifold assembly 1801 with the interchangeable flare housing 1800 fastened together by one or more through-bolt couplings 1805.

FIGS. 19A-C illustrate various views of interchangeable intake manifold assembly 1901 with interchangeable flare housing 1900 in accordance with another embodiment of the present invention FIG. 19A illustrates a perspective exploded view of interchangeable intake manifold assembly 1901 with the interchangeable flare housing 1900 fastened together by a set screw coupling 1905, according to an exemplary embodiment. Herein, a set screw is generally used as a detent to secure an object within or against another object, usually without using a nut.

As shown, a set screw coupling 1905 can be inserted into mating components 1902, 1904 of the interchangeable intake manifold assembly 1901 and interchangeable flare housing 1900, respectively. In one embodiment, the mating components 1902, 1904 are disposed on the flanges 1903, 1906 and each have threaded holes therein to receive the set screw coupling 1905. It is noted that the set screw coupling 1905 inserted into mating components 1902 and 1904 may fasten the interchangeable intake manifold assembly 1901 to the interchangeable flare housing 1900 as to not require an adhesive and/or further securing means to ensure the set screw coupling 1905 does not become unfastened (e.g., back out) from mating components 1902 and 1904 due to vibration and/or other factors that may cause unfastening.

FIG. 19B illustrates a front view of the interchangeable intake manifold assembly 1901 with the interchangeable flare housing 1901 fastened together by the set screw coupling, according to an exemplary embodiment whereas FIG. 19C illustrates a sectional exploded view of the interchangeable intake manifold assembly 1901 with the interchangeable flare housing 1900 fastened together by the set screw coupling 1903, according to an exemplary embodiment. Further shown, threaded holes 1904 are shown in which the set screw couplings 1903 are fitted therein.

Figure 20B:
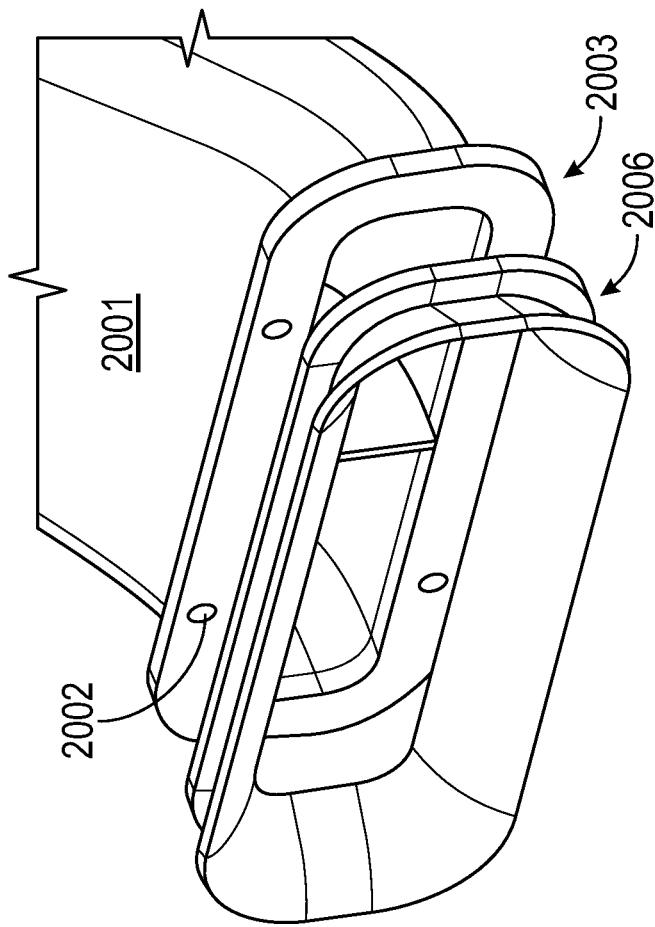
FIG. 20B illustrates a perspective exploded view of the interchangeable intake manifold assembly with the interchangeable flare housing fastened together by the magnetic coupling, according to an exemplary embodiment.
Figure 20A:
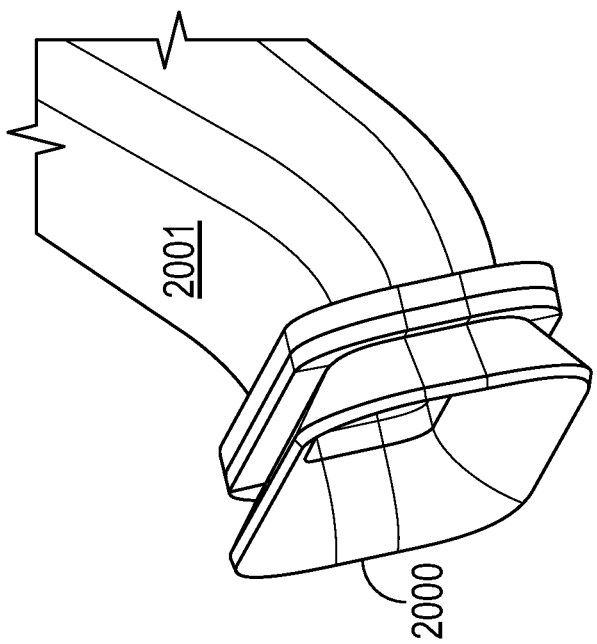
FIG. 20A illustrates a perspective view of an interchangeable intake manifold assembly with an interchangeable flare housing fastened together by a magnetic coupling, according to an exemplary embodiment.

FIGS. 20A-B illustrate various views of interchangeable intake manifold assembly 2001 with interchangeable flare housing 2000 in accordance with another embodiment of the present invention. FIG. 20A illustrates a perspective view of an interchangeable intake manifold assembly 2001 with an interchangeable flare housing 2000 fastened together by a magnetic coupling, according to an exemplary embodiment.

FIG. 20B illustrates a perspective exploded view of the interchangeable intake manifold assembly 2001 with the interchangeable flare housing 2000 fastened together by the magnetic coupling 2002 disposed on the flange 2003 of the interchangeable intake manifold assembly 2001, according to an exemplary embodiment. Although three magnetic coupling 2002 are shown, the present disclosure is not limited thereto. As such, more or less than the number of magnetic coupling 2002 shown in FIG. 20B may be disposed on the flange 2003. Likewise, one or more magnetic couplings 2002 may be disposed on the flange 2006 of the interchangeable flare housing 2000. In some embodiments, the number of magnetic couplings 2002 disposed on the flange 2006 of the interchangeable flare housing 2000 and the interchangeable intake manifold assembly 2001 are the same. Moreover, the magnetic couplings 2002 disposed on the flanges 2003, 2003 are dipoles of each other.

Figure 21B:
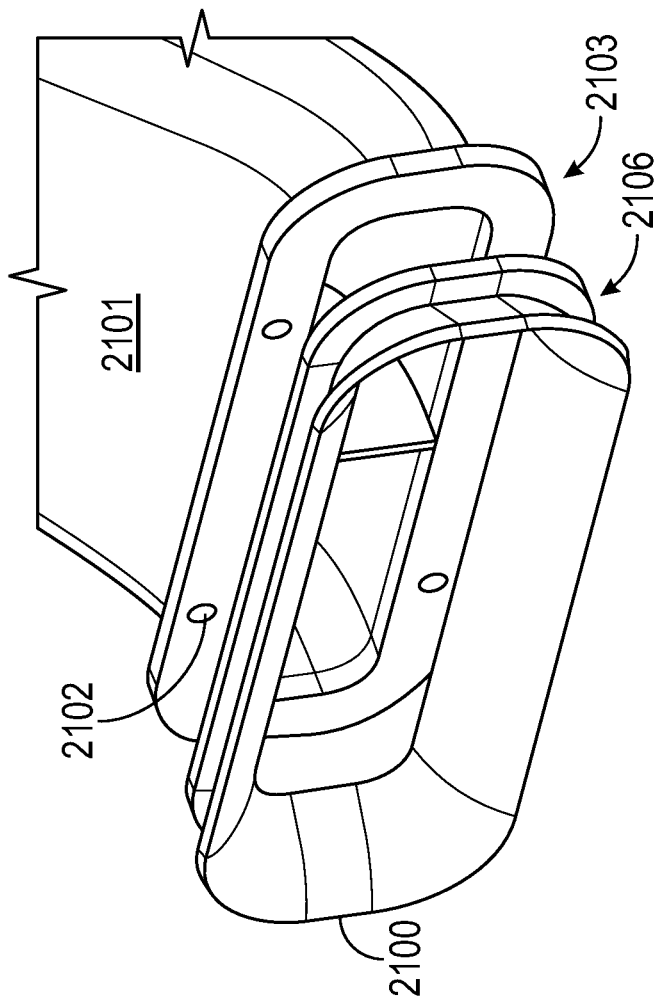
FIG. 21B illustrates a perspective exploded view of the interchangeable intake manifold assembly with the interchangeable flare housing fastened together by the adhesive coupling, according to an exemplary embodiment.
Figure 21A:
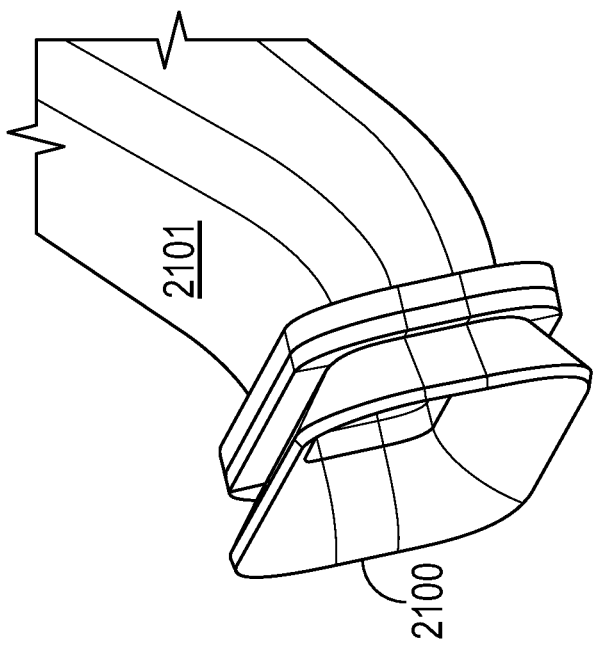
FIG. 21A illustrates a perspective view of an interchangeable intake manifold assembly with an interchangeable flare housing fastened together by an adhesive coupling, according to an exemplary embodiment.

FIGS. 21A-B illustrate various views of interchangeable intake manifold assembly 2101 with interchangeable flare housing 2100 in accordance with another embodiment of the present invention. FIG. 21A illustrates a perspective view of interchangeable intake manifold assembly 2101 with an interchangeable flare housing 2100 fastened together by an adhesive coupling, according to an exemplary embodiment. In one or more embodiments, the adhesive coupling is a non-permanent adhesive such that the interchangeable flare housing 2100 can be replaced. Exemplary adhesive couplings may include, but are not limited to, adhesive gels, putties, moldable glues, and the like.

FIG. 21B illustrates a perspective exploded view of the interchangeable intake manifold assembly 2100 with the interchangeable flare housing 2100 fastened together by the adhesive coupling 2102, according to an exemplary embodiment. Adhesive coupling 2102 may be disposed on the surface of flanges 2103, 2106 of the interchangeable intake manifold assembly 2101 and the interchangeable flare housing 2100.

Figure 22C:
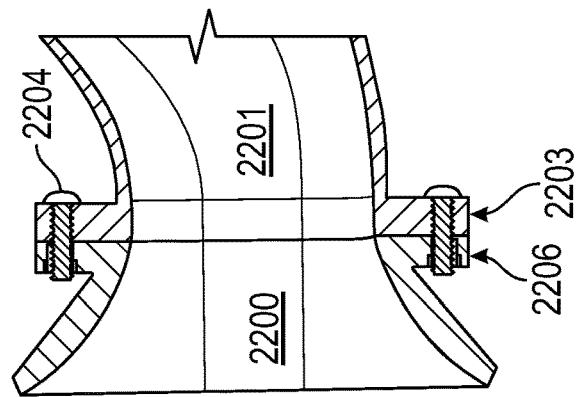
FIG. 22C illustrates a top sectional view of the interchangeable intake manifold assembly with the interchangeable flare housing fastened together by the bolted flange coupling, according to an exemplary embodiment.
Figure 22B:
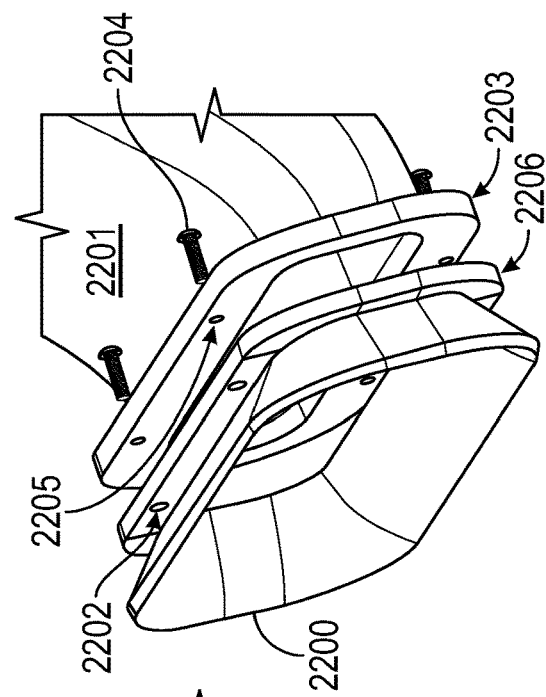
FIG. 22B illustrates a perspective exploded view of the interchangeable intake manifold assembly with the interchangeable flare housing fastened together by a bolted flange coupling, according to an exemplary embodiment.
Figure 22A:
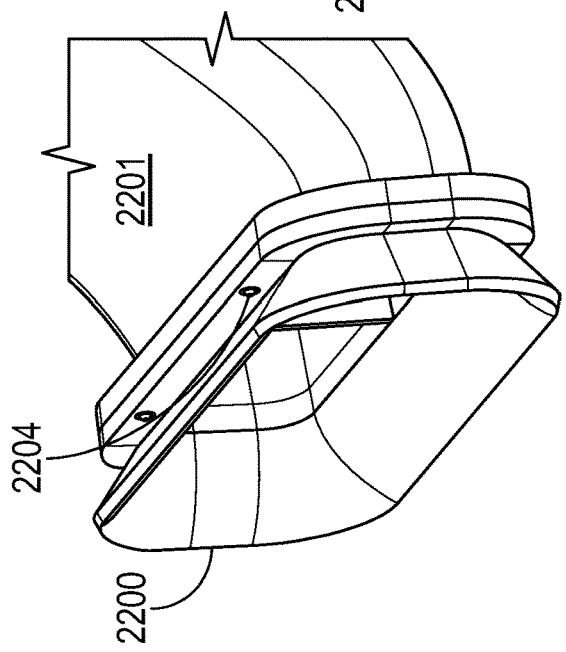
FIG. 22A illustrates a perspective view of an interchangeable intake manifold assembly with the interchangeable flare housing fastened together by a bolted flange coupling, according to an exemplary embodiment.

FIGS. 22A-C illustrate various views of interchangeable intake manifold assembly 2201 with interchangeable flare housing 2000 in accordance with another embodiment of the present invention. FIG. 22A illustrates a perspective view of interchangeable intake manifold assembly 2201 with an interchangeable flare housing 2200 fastened together by a bolted flange coupling 2204, according to an exemplary embodiment.

FIG. 22B illustrates a perspective exploded view of the interchangeable intake manifold assembly 2200 with the interchangeable flare housing 2201 fastened together by the bolted flange coupling 2204, according to an exemplary embodiment. As shown, a bolted flange coupling 2204 may be inserted into mating components 2202, 2205 of the interchangeable intake manifold assembly 2201 and interchangeable flare housing 2200, respectively. In one embodiment, the mating components 2202, 2205 disposed on the surface of flanges 2203, 2206 of the respective components have threaded holes therein to receive the bolted flange coupling 2204. FIG. 22C illustrates a top sectional view of the interchangeable intake manifold assembly 2201 with the interchangeable flare housing 2200 fastened together by the bolted flange coupling 2204, according to an exemplary embodiment. It is noted that bolted flange coupling 2204 inserted into mating components 2202 and 2205 may fasten the interchangeable intake manifold assembly 2201 to the interchangeable intake manifold assembly 2200 as to not require an adhesive and/or further securing means to ensure bolted flange coupling 2204 does not become unfastened (e.g., back out) from mating components 2202 and 2205 due to vibration and/or other factors that may cause unfastening.

FIGS. 23A-B illustrate various views of interchangeable intake manifold assembly 2301 with interchangeable flare housing 2000 in accordance with another embodiment of the present invention. FIG. 23A illustrates a perspective view of interchangeable intake manifold assembly 2301 having a tubular body with an interchangeable flare housing 2300 fastened together by screw couplings, according to an exemplary embodiment. Accordingly, the present disclosure is not limited to an interchangeable intake manifold assembly 2301 with a rectangular aperture configured to receive and engage a rectangular automobile intake airbox. For example, the interchangeable intake manifold assembly 2301 has a circular aperture configured to receive and engage a circular automobile intake airbox.

FIG. 23B illustrates a perspective exploded view of the interchangeable intake manifold assembly 2301 having a tubular body with the interchangeable flare housing 2300 fastened together by the screw couplings 2304, according to an exemplary embodiment. Likewise, the interchangeable intake manifold assembly 2301 has screw couplings 2302 at one end that interfaces with interchangeable flare housing 2300.

Figure 24C:
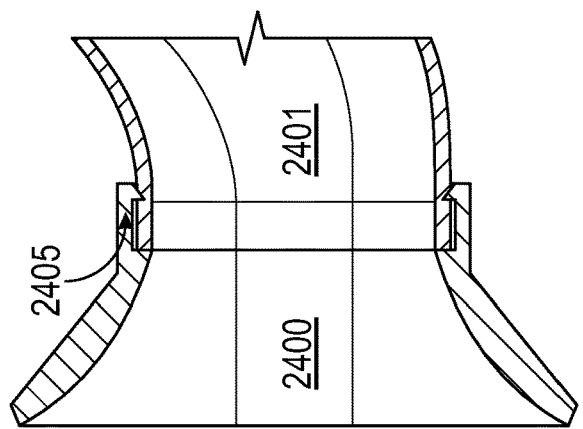
FIG. 24C illustrates a top sectional view of the interchangeable intake manifold assembly with the interchangeable flare housing fastened together by the hook and groove snap fit coupling, according to an exemplary embodiment.
Figure 24B:
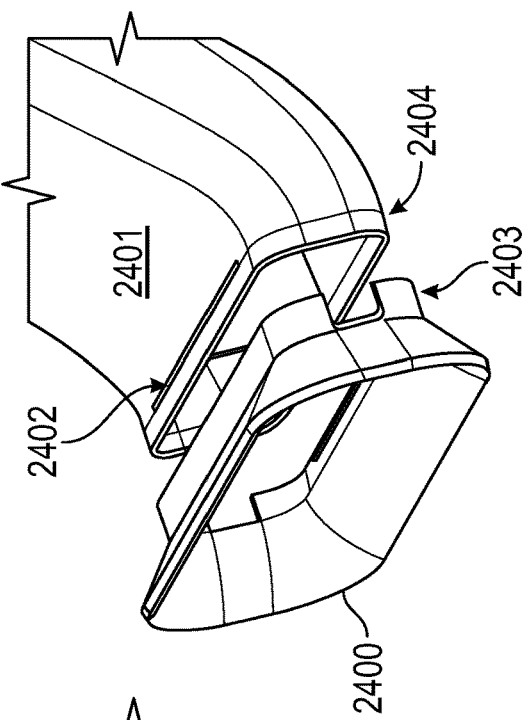
FIG. 24B illustrates a perspective exploded view of the interchangeable intake manifold assembly with the interchangeable flare housing fastened together by the hook and groove snap fit coupling, according to an exemplary embodiment.
Figure 24A:
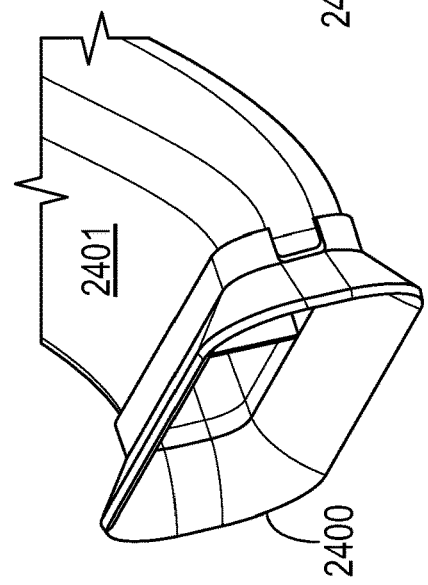
FIG. 24A illustrates a perspective view of the interchangeable intake manifold assembly with the interchangeable flare housing fastened together by a hook and groove snap fit coupling, according to an exemplary embodiment.

FIGS. 24A-C illustrate various views of interchangeable intake manifold assembly 2401 with interchangeable flare housing 2400 in accordance with another embodiment of the present invention. FIG. 24A illustrates a perspective view of the interchangeable intake manifold assembly 2401 with the interchangeable flare housing 2400 fastened together by a hook and groove snap fit coupling, according to an exemplary embodiment.

FIG. 24B illustrates a perspective exploded view of the interchangeable intake manifold assembly 2400 with the interchangeable flare housing 2401 fastened together by the hook and groove snap fit coupling (components 2402, 2405), according to an exemplary embodiment. Notably, the hook and groove snap fit coupling occurs at the top and bottom of the connection interface of the interchangeable intake manifold assembly 2401 and the interchangeable flare housing 2400.

As shown, the flange 2403 of the interchangeable flare housing 2400 has a hook element 2405 that can snap fit into a depression 2402 of the interchangeable intake manifold assembly 2401. In one or more embodiments, hook elements 2405 are deflected during the coupling process and catches a feature in the depression 2402. It should be understood by one having ordinary skill in the art that the present disclosure is not limited to a hook element 2405. For example, a stud or bead are also components which may affect a snap fit coupling.

FIG. 24C illustrates a top sectional view of the interchangeable intake manifold assembly 2401 with the interchangeable flare housing 2400 fastened together by the hook and groove snap fit coupling, according to an exemplary embodiment.

Figure 25B:
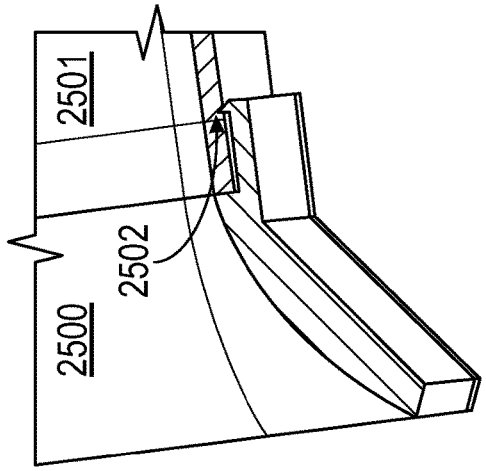
FIG. 25B illustrates a perspective exploded view of the interchangeable intake manifold assembly with the interchangeable flare housing fastened together by the hook and groove snap fit coupling, according to an exemplary embodiment.
Figure 25D:
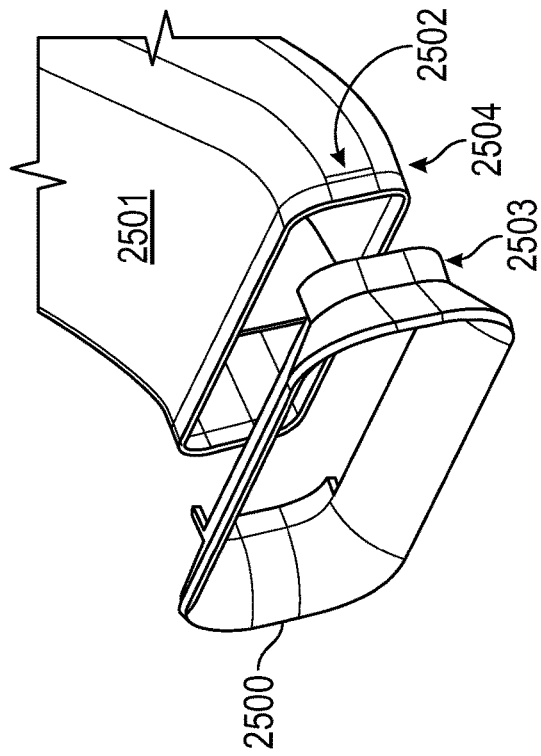
FIG. 25D illustrates a top sectional view of the interchangeable intake manifold assembly with the interchangeable flare housing fastened together by the hook and groove snap fit coupling, according to an exemplary embodiment.
Figure 25A:
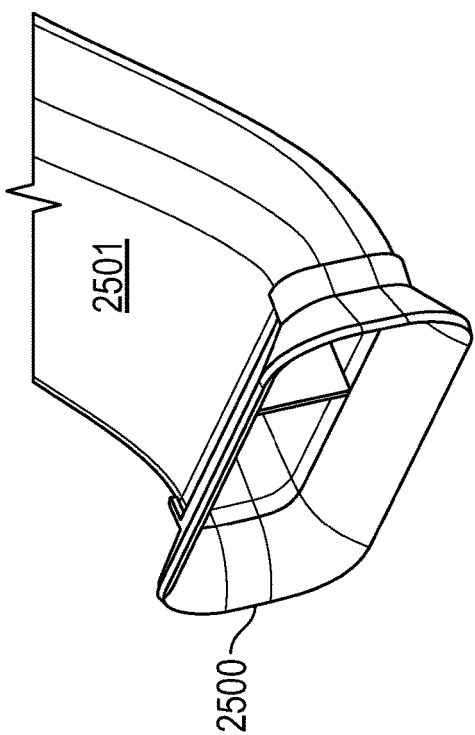
FIG. 25A illustrates a perspective view of another interchangeable intake manifold assembly with the interchangeable flare housing fastened together by a hook and groove snap fit coupling, according to an exemplary embodiment.

FIGS. 25A-D illustrate various views of interchangeable intake manifold assembly 2501 with interchangeable flare housing 2500 in accordance with another embodiment of the present invention. FIG. 25A illustrates a perspective view of another interchangeable intake manifold assembly 2501 with the interchangeable flare housing 2500 installed thereon with a hook and groove snap fit coupling, according to an exemplary embodiment. Notably, the hook and groove snap fit coupling occurs at the sides of the connection interface of the interchangeable intake manifold assembly 2501 and the interchangeable flare housing 2500.

FIG. 25B illustrates a perspective exploded view of the interchangeable intake manifold assembly 2501 with the interchangeable flare housing 2500 fastened together by the hook and groove snap fit coupling (components 2502, 2505), according to an exemplary embodiment. As shown, the flange 2503 of the interchangeable flare housing 2450 has a hook element 2505 that can snap fit into a depression 2502 of the interchangeable intake manifold assembly 2501. In one or more embodiments, a protruding part of one component (e.g., hook element 2505) is deflected during the coupling process and catches a feature in the depression 2502. It should be understood by one having ordinary skill in the art that the present disclosure is not limited to a hook element 2505. A stud or bead are also exemplary components which may affect a snap fit coupling.

Figure 25C:
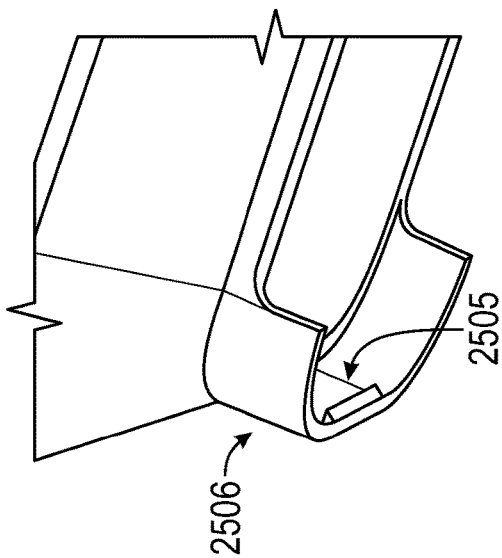
FIG. 25C illustrates a sectional side view of the interchangeable flare housing having a hook assembly, according to an exemplary embodiment.

FIG. 25C illustrates a sectional side view of the interchangeable flare housing 2500 having a hook assembly 2505 on a flange 2506 portion thereon, according to an exemplary embodiment whereas FIG. 25D illustrates a top sectional view of the interchangeable intake manifold assembly 2501 with the interchangeable flare housing 2500 fastened together by the hook and groove snap fit coupling, according to an exemplary embodiment.

Figure 26B:
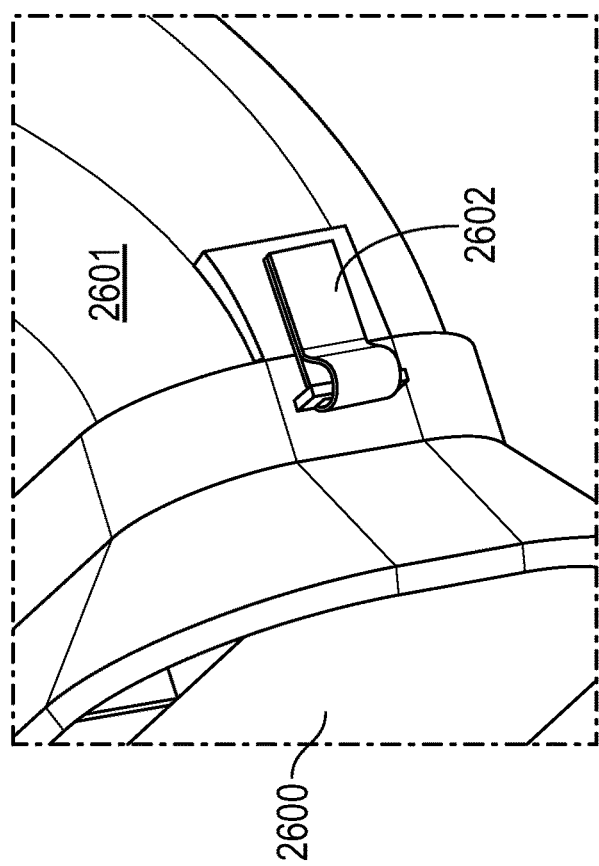
FIG. 26B illustrates a close-up side view of an interchangeable intake manifold assembly with an interchangeable flare housing fastened together by the Velcro strap coupling, according to an exemplary embodiment.
Figure 26A:
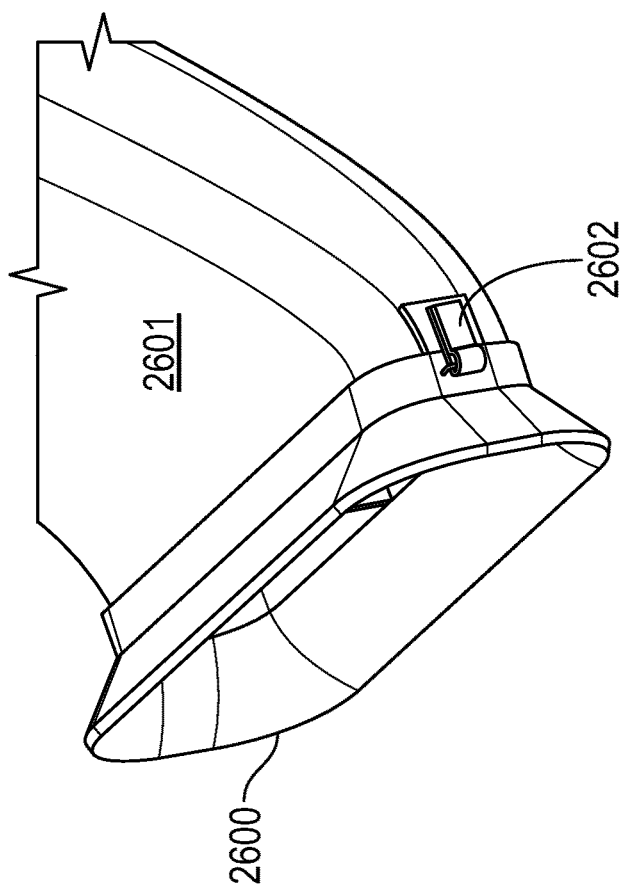
FIG. 26A illustrates a perspective view of an interchangeable intake manifold assembly with an interchangeable flare housing fastened together by a Velcro strap coupling, according to an exemplary embodiment.

FIGS. 26A-B illustrate various views of interchangeable intake manifold assembly 2601 with interchangeable flare housing 2600 in accordance with another embodiment of the present invention. FIG. 26A illustrates a perspective view of interchangeable intake manifold assembly 2601 with an interchangeable flare housing 2600 fastened together by a Velcro strap coupling 2602, according to an exemplary embodiment. It should be understood by one having ordinary skill in the art that the present disclosure is not limited to a Velcro strap coupling 2602. Any exemplary fabric hook-and-loop fastener may be employed so long as its use is consistent with the present disclosure.

FIG. 26B illustrates a close-up side view of an interchangeable intake manifold assembly 2601 with an interchangeable flare housing 2600 fastened together by the Velcro strap coupling 2602, according to an exemplary embodiment. The Velcro strap coupling 2602 may be mounted to sides of the interchangeable intake manifold assembly 2601 with an interchangeable flare housing 2600.

Figure 27B:
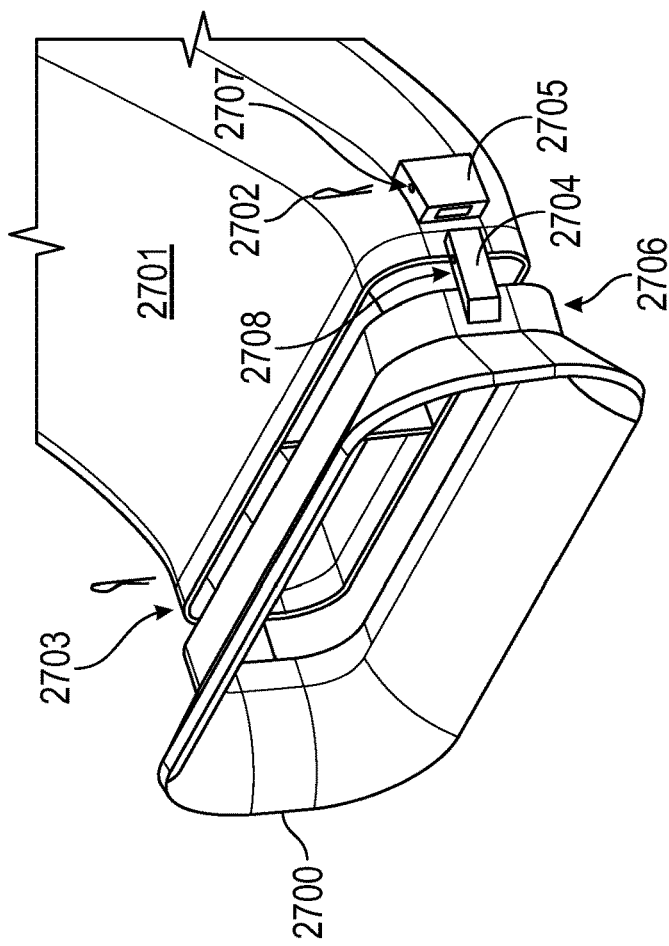
FIG. 27B illustrates a perspective exploded view of the interchangeable intake manifold assembly with the interchangeable flare housing fastened together by the cotter pins coupling, according to an exemplary embodiment.
Figure 27A:
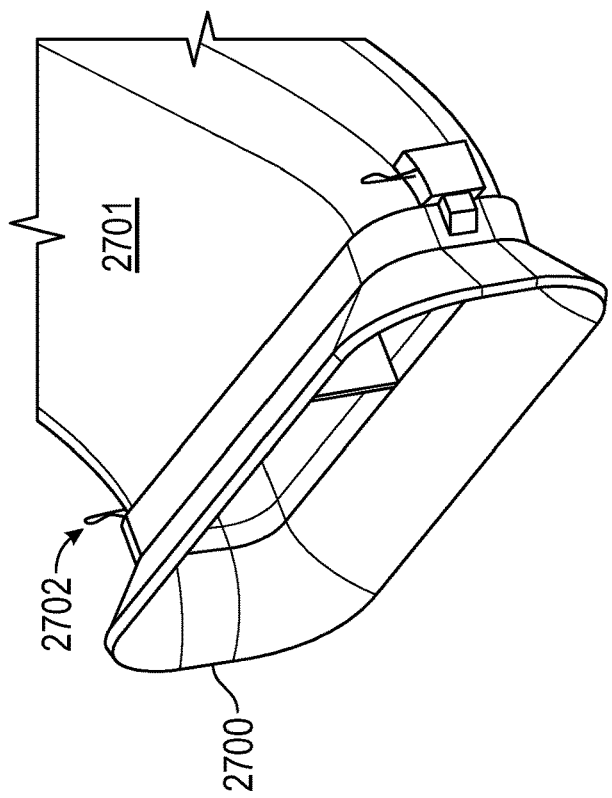
FIG. 27A illustrates a perspective view of an interchangeable intake manifold assembly with an interchangeable flare housing fastened together by a cotter pins coupling, according to an exemplary embodiment.

FIGS. 27A-B illustrate various views of interchangeable intake manifold assembly 2701 with interchangeable flare housing 2700 in accordance with another embodiment of the present invention. FIG. 27A illustrates a perspective view of interchangeable intake manifold assembly 2701 with an interchangeable flare housing 2700 fastened together by a cotter pins coupling 2702, according to an exemplary embodiment. Herein, a cotter pin may be defined as wire formed pins with two prongs that separate during installation and may be used as a locking device to hold pins or castle nuts in place.

FIG. 27B illustrates a perspective exploded view of the interchangeable intake manifold assembly 2701 with the interchangeable flare housing 2700 fastened together by the cotter pins coupling 2702, according to an exemplary embodiment. Notably, interchangeable intake manifold assembly 2701 has a dual-lock mechanism, particularly the cutter pins couplings 2702 and snap fit couplings (i.e., components 2704, 2705).

A male connector component 2704 disposed on a flange portion 2706 may be snap fitted in a corresponding female connector component 2705 which is disposed on the side of the interchangeable intake manifold assembly 2701. After the male connector component 2704 is connected in the female connector component 2705, the cotter pins 2703 can be inserted into the designated channels 2707, 2708 in the snap fit coupling components 2704, 2705.

Figure 28B:
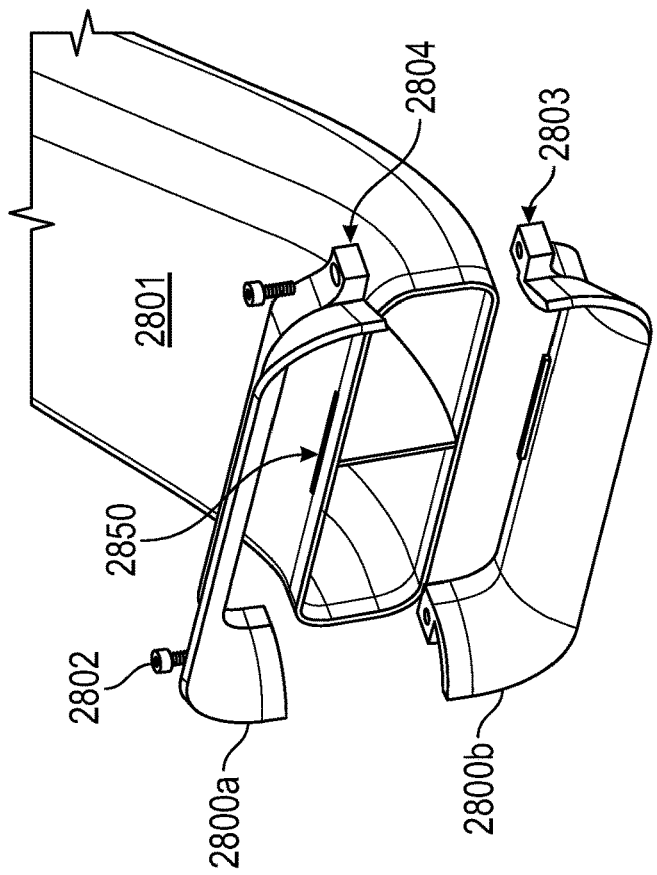
FIG. 28B illustrates a perspective exploded view of an interchangeable intake manifold assembly with a clamshell interchangeable flare housing fastened together by a hook and groove snap fit coupling, according to an exemplary embodiment.
Figure 28A:
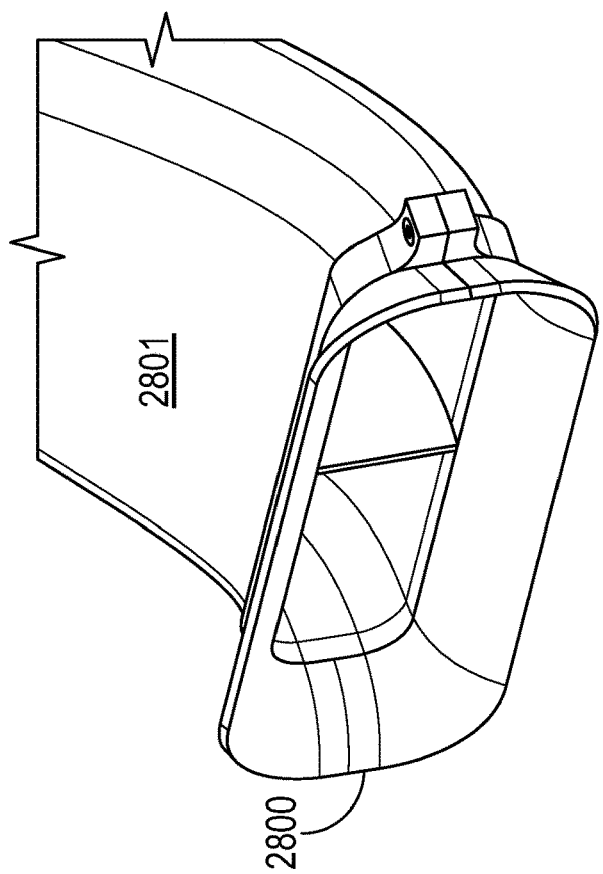
FIG. 28A illustrates a perspective view of an interchangeable intake manifold assembly with a clamshell interchangeable flare housing fastened together by a hook and groove snap fit coupling, according to an exemplary embodiment.

FIGS. 28A-B illustrate various views of interchangeable intake manifold assembly 2801 with interchangeable flare housing 2800 in accordance with another embodiment of the present invention. FIG. 28A illustrates a perspective view of an interchangeable intake manifold assembly 2801 with a clamshell interchangeable flare housing 2801 fastened together by a hook and groove snap fit coupling, according to an exemplary embodiment. In the embodiment shown, the clamshell interchangeable flare housing 2801 is a two-piece flare housing. However, the present disclosure is not limited thereto as would be appreciated by one having ordinary skill in the art.

FIG. 28B illustrates a perspective exploded view of an interchangeable intake manifold assembly 2801 with a clamshell interchangeable flare housing 2800 fastened together by a hook and groove snap fit coupling, according to an exemplary embodiment. Notably, clamshell interchangeable flare housing 2800 consists of two pieces 2800a, 2800b. When the flare housing pieces 2800a, 2800b are connected together (e.g., by a bolt, rivet, or set screw) as a single clamshell interchangeable flare housing 2800, the housing 2800 may be fitted into the top and bottom grooves 2805 of the clamshell interchangeable flare housing 2801 to affect a snap connection.

Figure 29B:
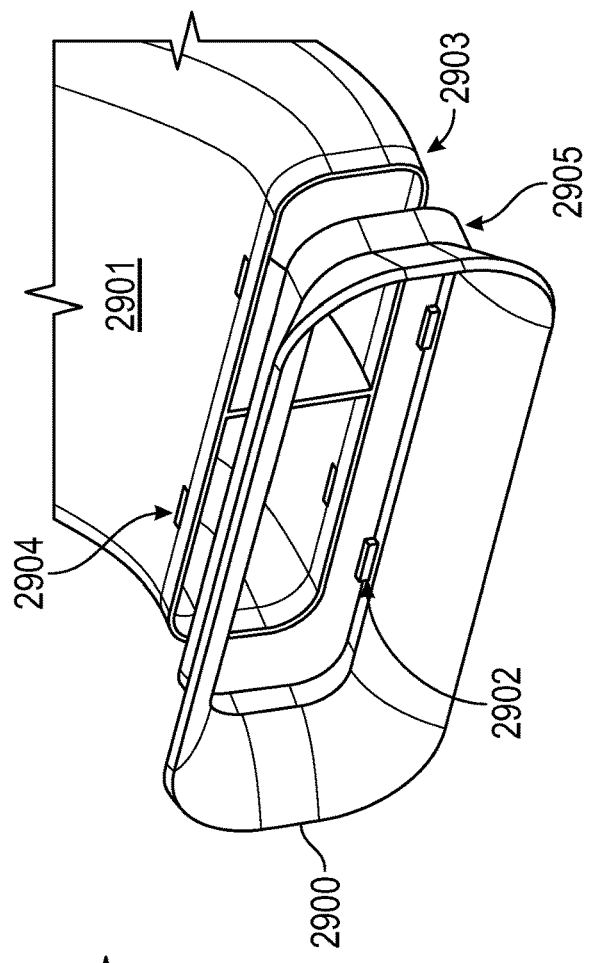
FIG. 29B illustrates a perspective exploded view of an interchangeable intake manifold assembly with an interchangeable flare housing fastened together by snap coupling components, according to an exemplary embodiment.
Figure 29A:
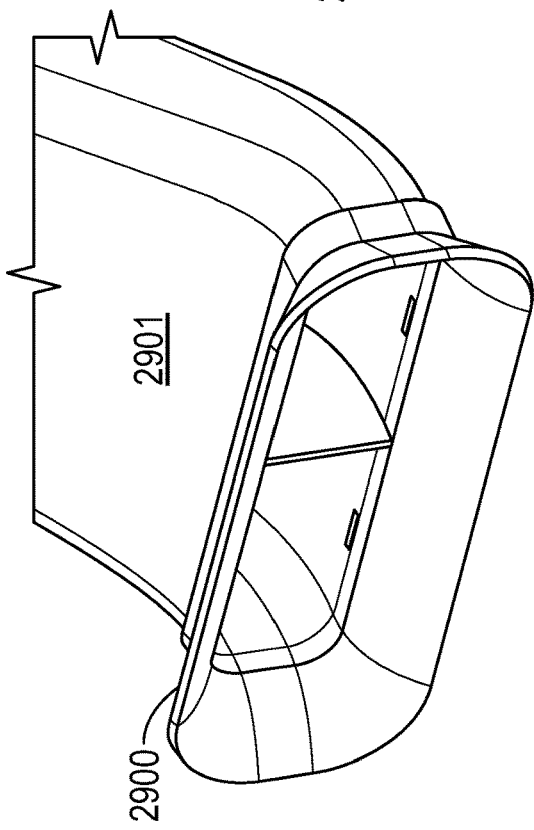
FIG. 29A illustrates a perspective view of an interchangeable intake manifold assembly with an interchangeable flare housing fastened together by snap coupling components, according to an exemplary embodiment.

FIGS. 29A-B illustrate various views of interchangeable intake manifold assembly 2901 with interchangeable flare housing 2900 in accordance with another embodiment of the present invention. FIG. 29A illustrates a perspective view of an interchangeable intake manifold assembly 2901 with an interchangeable flare housing 2900 fastened together by snap coupling components, according to an exemplary embodiment.

FIG. 29B illustrates a perspective exploded view of an interchangeable intake manifold assembly 2901 with an interchangeable flare housing 2900 installed thereon with snap coupling components (i.e., snap teeth 2902 and grooves 2904), according to an exemplary embodiment. Notably, the snap teeth 2902 are disposed at the top and bottom of the flange 2905 of the interchangeable flare housing 2900 whereas the grooves 2904 are disposed at the top and bottom of the flange 2903 of the intake manifold assembly 2901.

Figure 30B:
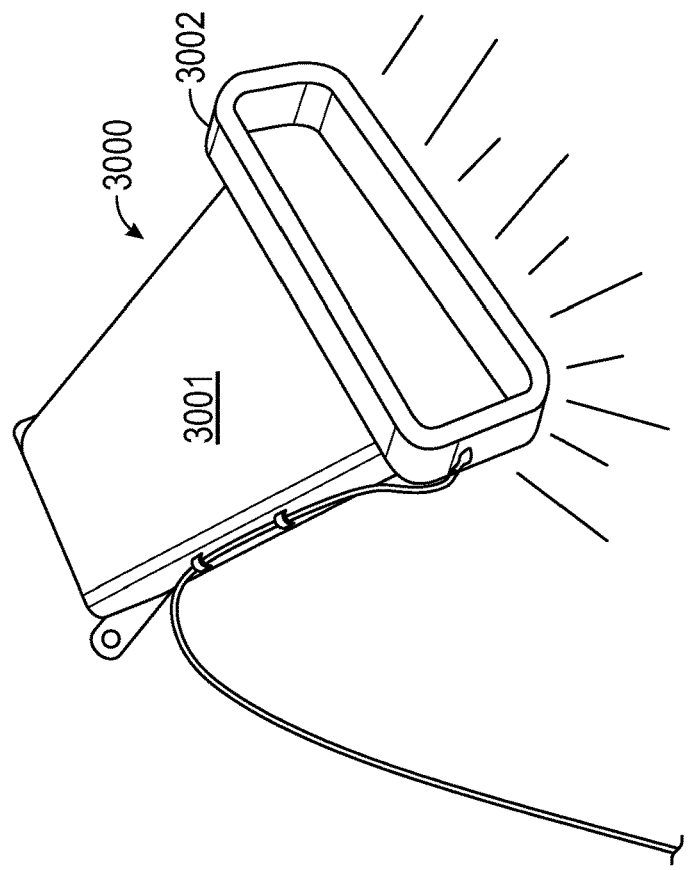
FIG. 30B illustrates a front perspective view of an interchangeable intake manifold assembly with an interchangeable flare housing having a lit LED unit installed thereon, according to an exemplary embodiment.
Figure 30A:
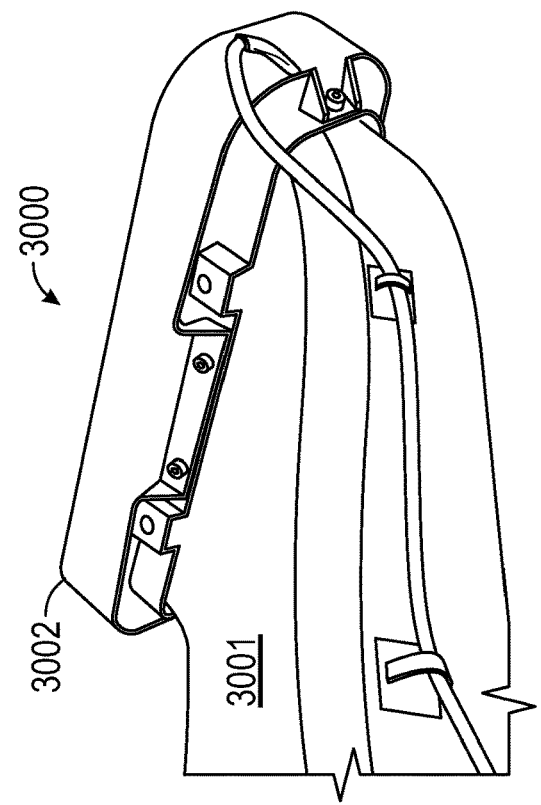
FIG. 30A illustrates a back perspective view of an interchangeable intake manifold assembly with an interchangeable flare housing having an unlit LED unit installed thereon, according to an exemplary embodiment.

FIGS. 30A-B illustrate various views of interchangeable intake manifold assembly 3001 with interchangeable flare housing 3000 in accordance with another embodiment of the present invention. FIG. 30A illustrates a back perspective view of an interchangeable intake manifold assembly 3001 with an interchangeable flare housing 3000 having an unlit light emitting diode (LED) unit 3002 installed thereon, according to an exemplary embodiment. The LED unit 3002 may emit light for aesthetic or other effects. The LED unit 3002 can emit several colors of light at high intensities.

FIG. 30B illustrates a front perspective view of an interchangeable intake manifold assembly 3001 with an interchangeable flare housing 3000 having a lit LED unit installed thereon, according to an exemplary embodiment. In the embodiment shown, the LED unit 3002 is disposed within the interior of the interchangeable flare housing 3000. In this embodiment, the interchangeable flare housing 3000 may be transparent such that the light that emanates from the LED unit 3002 is readily visible.

These and other features and functionality are included within the scope of exemplary embodiments of the present disclosure.

C. Aspects

The present invention may include a plurality of aspects disclosed herein. For example, the following aspects may be included in one or more differing implementations of the present invention.

Aspect 1: An interchangeable intake assembly, comprising: a base member being defined by a rectangular aperture configured to receive and engage an automobile intake box, the base member being further defined by a perimeter surrounding the rectangular aperture and having at least one fastener or aperture configured to receive a fastener dimensioned to avoid disturbing the automobile intake box; a gooseneck member fixedly attached to the base member, the gooseneck member having a first end opening and a second end opening, the gooseneck member having an interior cavity configured to direct air into the automobile intake box from the second end opening to the first end opening through the interior cavity; and an interchangeable bell housing removably secured to the second end opening of the gooseneck member, the interchangeable bell housing having a frustoconical shaped cross section on at least one plane.

Aspect 2: The interchangeable intake assembly of any preceding aspect, wherein the rectangular aperture includes at least one rounded corner.

Aspect 3: The interchangeable intake assembly of aspect 1 or 2, wherein the base member is further defined by having a generally rectangular shape encompassing the perimeter.

Aspect 4: The interchangeable intake assembly of any preceding aspect, wherein the generally rectangular shape is a rhomboid or parallelogram dimensioned to engage existing fasteners or apertures configured to receive fasteners existing in an automobile.

Aspect 5: The interchangeable intake assembly of any preceding aspect, wherein the gooseneck member is dimensioned to support the interchangeable bell housing to be visible external to an automobile.

Aspect 6: The interchangeable intake assembly of any preceding aspect, wherein visible external to the automobile comprises visibility behind a forward intake grille of the automobile.

Aspect 7: The interchangeable intake assembly of any preceding aspect, wherein the base member and the gooseneck member are formed of metal, plastic, fused metal, 3-D printed material, or rigid material.

Aspect 8: The interchangeable intake assembly of any preceding aspect, wherein the interchangeable bell housing is formed of metal, plastic, injection-molded plastic, 3-D printed plastic, or a rigid material.

Aspect 9: The interchangeable intake assembly of any preceding aspect, wherein the interchangeable bell housing is formed of integrally colored material or coated in paint.

Aspect 10: The interchangeable intake assembly of any preceding aspect, wherein the integrally formed colored material or paint is metallic or reflective.

Aspect 11: An interchangeable intake assembly, comprising: a gooseneck member fixedly attached within an engine bay of an automobile, the gooseneck member having a first end opening and a second end opening, the gooseneck member having an interior cavity configured to direct air into an automobile intake airbox from the second end opening to the first end opening through the interior cavity; and an interchangeable bell housing removably secured to the second end opening of the gooseneck member, the interchangeable bell housing having a frustoconical shaped cross section on at least one plane.

Aspect 12: The interchangeable intake assembly of any preceding aspect, wherein the gooseneck member is dimensioned to support the interchangeable bell housing to be visible external to an automobile.

Aspect 13: The interchangeable intake assembly of any preceding aspect, wherein visible external to the automobile comprises visibility behind a forward intake grille of the automobile.

Aspect 14: The interchangeable intake assembly of any preceding aspect, wherein the base member and the gooseneck member are formed of metal, plastic, fused metal, 3-D printed material, or rigid material.

Aspect 15: The interchangeable intake assembly of any preceding aspect, wherein the interchangeable bell housing is formed of metal, plastic, injection-molded plastic, 3-D printed plastic, or a rigid material.

Aspect 16: An interchangeable intake assembly, comprising: a base member being defined by a rectangular aperture configured to receive and engage an automobile intake airbox, the rectangular aperture comprising at least four rounded corners, the base member being further defined by a perimeter surrounding the rectangular aperture and having two or more fasteners or apertures configured to receive fastener dimensioned to avoid disturbing the automobile intake airbox, the base member being formed of a rigid material; a gooseneck member fixedly attached to the base member, the gooseneck member having a first end opening and a second end opening, the first end opening being in fluid communication with the rectangular aperture, the gooseneck member having an interior cavity configured to direct air into the automobile intake airbox from the second end opening to the first end opening through the interior cavity; and an interchangeable bell housing removably secured to the second end opening of the gooseneck member, the interchangeable bell housing having a frustoconical shaped cross section on at least one plane and configured to receive air through a forward automotive intake grille arranged in front of the interchangeable bell housing such that the interchangeable bell housing is visible through the forward automotive intake grille.

Aspect 17: The interchangeable intake assembly of any preceding aspect, wherein the base member is further defined by having a generally rectangular shape encompassing the perimeter.

Aspect 18: The interchangeable intake assembly of any preceding aspect, wherein the generally rectangular shape is a rhomboid or parallelogram dimensioned to engage existing fasteners or apertures configured to receive fasteners existing in an automobile.

Aspect 19: The interchangeable intake assembly of any preceding aspect, wherein the interchangeable bell housing has a rectangular bell shape to aid in receiving air through the forward automotive intake grill.

Aspect 20: The interchangeable intake assembly of any preceding aspect, wherein the interchangeable bell housing is formed of metal, plastic, injection-molded plastic, 3-D printed plastic, or a rigid material.

Aspect 21: An interchangeable intake assembly, comprising: a base member being defined by a rectangular aperture configured to receive and engage an automobile intake box, the base member being further defined by a perimeter surrounding the rectangular aperture and having at least one fastener or aperture configured to receive a fastener dimensioned to avoid disturbing the automobile intake box, wherein the base member having a first end opening and a second end opening, the base member having an interior cavity configured to direct air into the automobile intake box from the second end opening to the first end opening through the interior cavity; and an interchangeable flare housing removably secured to the second end opening of the base member, the interchangeable flare housing having a frustoconical shaped cross section on at least one plane.

Aspect 22: The interchangeable intake assembly of any preceding aspect, wherein the interchangeable flare housing is removably secured to the second end opening of the base member by at least one of a through-bolt or through-rivet.

Aspect 23: The interchangeable intake assembly of any preceding aspect, wherein the interchangeable flare housing is removably secured to the second end opening of the base member by a set screw.

Aspect 24: The interchangeable intake assembly of any preceding aspect, wherein the interchangeable flare housing is removably secured to the second end opening of the base member by a set of magnets.

Aspect 25: The interchangeable intake assembly of any preceding aspect, wherein the interchangeable flare housing is removably secured to the second end opening of the base member by a non-permanent adhesive.

Aspect 26: The interchangeable intake assembly of any preceding aspect, wherein the interchangeable flare housing is removably secured to the second end opening of the base member by a bolted flange.

Aspect 27: The interchangeable intake assembly of any preceding aspect, wherein the interchangeable flare housing is removably secured to the second end opening of the base member by a screw coupling.

Aspect 28: The interchangeable intake assembly of any preceding aspect, wherein the interchangeable flare housing is removably secured to the second end opening of the base member by a hook and groove snap fit coupling.

Aspect 29: The interchangeable intake assembly of any preceding aspect, wherein the interchangeable flare housing is removably secured to the second end opening of the base member by a Velcro strap.

Aspect 30: The interchangeable intake assembly of any preceding aspect, wherein the interchangeable flare housing has an LED unit within an interior region.

An interchangeable intake assembly, comprising: a base member being defined by a rectangular aperture configured to receive and engage an automobile intake box, the base member being further defined by a perimeter surrounding the rectangular aperture and having at least one fastener or aperture configured to receive a fastener dimensioned to avoid disturbing the automobile intake box, wherein the base member having a first end opening and a second end opening, the base member having an interior cavity configured to direct air into the automobile intake box from the second end opening to the first end opening through the interior cavity; and an interchangeable flare housing having a clamshell assembly, the interchangeable flare housing is removably secured to the second end opening of the base member, the interchangeable flare housing having a frustoconical shaped cross section on at least one plane.

Aspect 31: The interchangeable intake assembly of any preceding aspect, wherein the base member is dimensioned to support the interchangeable flare housing to be visible external to an automobile.

Aspect 32: The interchangeable intake assembly of any preceding aspect, wherein visible external to the automobile comprises visibility behind a forward intake grille of the automobile.

Aspect 33: The interchangeable intake assembly of any preceding aspect, wherein the interchangeable flare housing has an LED unit within an interior region.

Aspect 34: The interchangeable intake assembly of any preceding aspect, wherein the clamshell assembly comprises aa first member and a second member that are secured together by a fastener.

Aspect 35: An interchangeable intake assembly, comprising: a base member being defined by a rectangular aperture configured to receive and engage an automobile intake box, the base member being further defined by a perimeter surrounding the rectangular aperture and having at least one fastener or aperture configured to receive a fastener dimensioned to avoid disturbing the automobile intake box, wherein the base member having a first end opening and a second end opening, the base member having an interior cavity configured to direct air into the automobile intake box from the second end opening to the first end opening through the interior cavity; and an interchangeable flare housing having an LED unit, the interchangeable flare housing is removably secured to the second end opening of the base member, the interchangeable flare housing having a frusto-conical shaped cross section on at least one plane.

Aspect 36: The interchangeable intake assembly of any preceding aspect, wherein the base member is further defined by having a generally rectangular shape encompassing the perimeter.

Aspect 37: The interchangeable intake assembly of any preceding aspect, further comprising a pair of female coupling units on sides of the base member and a pair of male coupling units on sides of the interchangeable flare housing.

Aspect 38: The interchangeable intake assembly of any preceding aspect, wherein the LED unit is electrically coupled to a braking system.

Aspect 39: The interchangeable intake assembly of any preceding aspect, wherein the LED unit is within the interior of the interchangeable flare housing.

Aspect 40: The interchangeable intake assembly of any preceding aspect, wherein the gooseneck member is further defined by having a substantially rectangular tubular shape encompassing the perimeter.

Aspect 41: The interchangeable intake assembly of any preceding aspect, wherein visible external to the automobile comprises visibility behind a forward intake grille of the automobile.

Aspect 42: The interchangeable intake assembly of any preceding aspect, wherein the second end opening of the base member comprises a single cavity.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way appreciably intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications are referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present invention is not entitled to antedate such publication by virtue of prior invention. Further, the dates of publication provided herein can be different from the actual publication dates, which can require independent confirmation.

The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

The following is claimed:

1. An interchangeable intake assembly, comprising:
   a base member being defined by an aperture configured to receive and engage an automobile intake box, the base member being further defined by a perimeter surrounding the aperture and having at least one fastener or aperture configured to receive a fastener dimensioned to avoid disturbing the automobile intake box,
   the base member having a first end opening and a second end opening, the base member having an interior cavity configured to direct air into the automobile intake box from the second end opening to the first end opening through the interior cavity; and
   a plurality of interchangeable candidate flare housings, wherein each of the plurality of interchangeable candidate flare housing has a unique shape, and wherein each candidate flare housing is configured to be interchangeably and removably secured to the second end opening of the base member.

2. The interchangeable intake assembly of claim 1, wherein at least one interchangeable candidate flare housing is removably secured to the second end opening of the base member by at least one of the following:
   a through-bolt, and
   a through-rivet.

3. The interchangeable intake assembly of claim 1, wherein at least one interchangeable candidate flare housing is removably secured to the second end opening of the base member by at least one set screw.

4. The interchangeable intake assembly of claim 1, wherein at least one interchangeable candidate flare housing is removably secured to the second end opening of the base member by a set of magnets.

5. The interchangeable intake assembly of claim 1, wherein at least one interchangeable candidate flare housing is removably secured to the second end opening of the base member by a non-permanent adhesive.

6. The interchangeable intake assembly of claim 1, wherein at least one interchangeable candidate flare housing is removably secured to the second end opening of the base member by a bolted flange.

7. The interchangeable intake assembly of claim 1, wherein at least one interchangeable candidate flare housing is removably secured to the second end opening of the base member by threading, wherein the second end opening of the base member is configured to threadably engage the at least one interchangeable candidate flare housing by screwing it thereon.

8. The interchangeable intake assembly of claim 1, wherein at least one interchangeable candidate flare housing is removably secured to the second end opening of the base member by a hook and groove snap fit mechanism.

9. The interchangeable intake assembly of claim 1, wherein at least one interchangeable candidate flare housing is removably secured to the second end opening of the base member by a hook-and-loop fastener, wherein the hook-and-loop fastener is configured to be secured to a latch disposed on an outer surface of the at least one interchangeable candidate flare housing.

10. The interchangeable intake assembly of claim 1, wherein at least one interchangeable candidate flare housing includes an LED unit within an interior region.

11. The interchangeable intake assembly of claim 1, wherein at least one interchangeable candidate flare housing comprises at least one of the following:
- a substantially frustoconical shape,
- a substantially frustopyramidal shape,
- a substantially box shape,
- a substantially frustopolyhedrical shape,
- a substantially asymmetrical frustopolyhedrical shape,
- a substantially frustooctagonal-pyramidal shape, or
- a substantially asymmetrical frustooctagonal-pyramidal shape.

12. The interchangeable intake assembly of claim 1, wherein at least one interchangeable candidate flare housing has a substantially frustopyramidal shape, and wherein the second end opening of the base member comprises a single cavity.

13. An interchangeable intake assembly, comprising:
- a base member being defined by an aperture configured to receive and engage an automobile intake box, the base member being further defined by a perimeter surrounding the aperture and having at least one fastener or aperture configured to receive a fastener dimensioned to avoid disturbing the automobile intake box,
- wherein the base member having a first end opening and a second end opening, the base member having an interior cavity configured to direct air into the automobile intake box from the second end opening to the first end opening through the interior cavity; and
- a plurality of interchangeable candidate flare housings, each of the interchangeable candidate flare housings being removably secured to the second end opening of the base member, each of the interchangeable candidate flare housings comprising a unique shape selected from at least one of the following:
- a substantially frustoconical shape,
- a substantially frustopyramidal shape,
- a substantially frustocylindrical shape,
- a substantially box shape,
- a substantially frustopolyhedrical shape,
- a substantially asymmetrical frustopolyhedrical shape,
- a substantially frustooctagonal-pyramidal shape, or
- a substantially asymmetrical frustooctagonal-pyramidal shape.

14. The interchangeable intake assembly of claim 13, wherein the base member is dimensioned to support the secured interchangeable candidate flare housing to be visible external to an automobile.

15. The interchangeable intake assembly of claim 13, wherein at least one interchangeable candidate flare housing has an LED unit within a region interior to an outer surface of the interchangeable candidate flare housing effective to illuminate substantially all of the interchangeable flare housing.

16. The interchangeable intake assembly of claim 13, having a clamshell arrangement that comprises a first member and a second member that are secured together by a fastener.

17. An interchangeable intake assembly, comprising:
- a base member being defined by an aperture configured to receive and engage an automobile intake airbox, the aperture comprising at least four rounded corners, the base member being further defined by a perimeter surrounding the aperture and having two or more fasteners or apertures configured to receive fastener dimensioned to avoid disturbing the automobile intake airbox, the base member being formed of a rigid material;
- a gooseneck member fixedly attached to the base member, the gooseneck member having a first end opening and a second end opening, the first end opening being in fluid communication with the aperture, the gooseneck member having an interior cavity configured to direct air into the automobile intake airbox from the second end opening to the first end opening through the interior cavity;
- a plurality of interchangeable candidate bell housings, each candidate bell housing having a unique shape and being configured to receive air through a forward automotive intake grille arranged in front of the interchangeable candidate bell housing such that the interchangeable bell housing is visible through the forward automotive intake grille; and
- wherein at least one of the plurality of interchangeable candidate bell housings comprises an LED unit, and wherein each interchangeable candidate bell housing is configured to be removably secured to the second end opening of the gooseneck member.

18. The interchangeable intake assembly of claim 17, further comprising at least one female coupling unit on a side of the base member and at least one male coupling unit on a side of each interchangeable candidate bell housing.

19. The interchangeable intake assembly of claim 17, wherein the LED unit is electrically coupled to a braking system.

20. The interchangeable intake assembly of claim 17, wherein the LED unit is within a region interior to an outer surface of the interchangeable bell housing effective to illuminate all or substantially all of the interchangeable bell housing.

* * * * *